United States Patent
Han et al.

(10) Patent No.: US 12,243,284 B2
(45) Date of Patent: Mar. 4, 2025

(54) IMAGE CLASSIFICATION METHOD AND APPARATUS

(71) Applicant: HUAWEI TECHNOLOGIES CO., LTD., Guangdong (CN)

(72) Inventors: Kai Han, Beijing (CN); Yunhe Wang, Beijing (CN); Han Shu, Beijing (CN); Chunjing Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 448 days.

(21) Appl. No.: 17/587,689

(22) Filed: Jan. 28, 2022

(65) Prior Publication Data

US 2022/0157041 A1    May 19, 2022

Related U.S. Application Data

(63) Continuation of application No. PCT/CN2020/105830, filed on Jul. 30, 2020.

(30) Foreign Application Priority Data

Jul. 30, 2019    (CN) .......................... 201910697287.0

(51) Int. Cl.
*G06V 10/00*    (2022.01)
*G06V 10/44*    (2022.01)
(Continued)

(52) U.S. Cl.
CPC .......... *G06V 10/454* (2022.01); *G06V 10/764* (2022.01); *G06V 10/82* (2022.01)

(58) Field of Classification Search
CPC .... G06V 10/454; G06V 10/764; G06V 10/82; G06F 18/2193; G06F 18/241; G06N 3/045; G06N 3/063
See application file for complete search history.

(56) References Cited

U.S. PATENT DOCUMENTS

2018/0137406 A1    5/2018    Howard et al.
2018/0365580 A1    12/2018    Musuvathi et al.
(Continued)

FOREIGN PATENT DOCUMENTS

CN    107451075 A    12/2017
CN    109670506 A    4/2019
(Continued)

OTHER PUBLICATIONS

Lecun et al., Gradient-Based Learning Applied to Document Recognition, Proceedings of the IEEE, vol. 86, No. 11, pp. 2278-2324, Nov. 1998.*

(Continued)

*Primary Examiner* — Ping Y Hsieh
*Assistant Examiner* — Xiao Liu
(74) *Attorney, Agent, or Firm* — Fish & Richardson P.C.

(57) ABSTRACT

This application relates to an image recognition technology in the field of computer vision in the field of artificial intelligence, and provides an image classification method and apparatus. The method includes: obtaining an input feature map of a to-be-processed image; performing convolution processing on the input feature map based on M convolution kernels of a neural network, to obtain a candidate output feature map of M channels, where M is a positive integer; performing matrix transformation on the M channels of the candidate output feature map based on N matrices, to obtain an output feature map of N channels, where a quantity of channels of each of the N matrices is less than M, N is greater than M, and N is a positive integer; and classify the to-be-processed image based on the output feature map, to obtain a classification result of the to-be-processed image.

15 Claims, 9 Drawing Sheets

(51) Int. Cl.
  *G06V 10/764* (2022.01)
  *G06V 10/82* (2022.01)

(56) References Cited

U.S. PATENT DOCUMENTS

2019/0188537 A1* 6/2019 Dutta .................. G06F 18/24
2019/0220709 A1* 7/2019 Freeman ................ G06N 3/08

FOREIGN PATENT DOCUMENTS

| | | |
|---|---|---|
| CN | 110020682 A | 7/2019 |
| CN | 112686317 A | 4/2021 |
| CN | 114492754 A | 5/2022 |
| CN | 115879508 A | 3/2023 |

OTHER PUBLICATIONS

AlexeyAB, "GhostNet: More Features from Cheap Operatins—75.7% top-1 (better than than MobileNetV3)," retrieved on Apr. 14, 2022, retrieved from URL: <https://github.com/AlexeyAB/darknet/issues/4418>, Nov. 2019, 9 pages.

Huawei, "Ghostnet: Efficient Networks by Generating More Features from Cheap Operations," retrieved on Apr. 14, 2022, retrieved from URL: <https://pytorch.org/hub/pytorch_vision_ghostnet>, 2019, 3 pages.

Intel, "Intel® Distribution of OpenVINO™ Toolkit," Intel Developer Tools, retrieved on Apr. 14, 2022, retrieved from URL: <https://www.intel.com/content/www/us/en/developer/tools/openvino-toolkit/overview.html>, 2019, 9 pages.

PCT International Search Report and Written Opinion issued in International Application No. PCT/CN2020/105830 on Nov. 4, 2020, 15 pages (with English translation).

Extended European Search Report issued in European Application No. 20848554.0 on Sep. 2, 2022, 6 pages.

He et al., "Identity Mappings in Deep Residual Networks," European Conference on Computer Vision, Sep. 17, 2016, 16 pages.

Lecun et al., "Gradient-Based Learning Applied to Document Recognition," Proceedings of the IEEE, vol. 86, No. 11, Nov. 1998, 46 pages.

International Search Report and Written Opinion in International Appln. No. PCT/CN2023/120541, mailed on Dec. 26, 2023, 10 pages (with partial English translation).

International Search Report and Written Opinion in International Appln. No. PCT/CN2023/123636, mailed on Dec. 26, 2023, 13 pages (with partial English translation).

* cited by examiner

IMAGE CLASSIFICATION METHOD AND APPARATUS

CROSS-REFERENCE TO RELATED APPLICATIONS

This application is a continuation of International Application No. PCT/CN2020/105830, filed on Jul. 30, 2020, which claims priority to Chinese Patent Application No. 201910697287.0, filed on Jul. 30, 2019. The disclosures of the aforementioned applications are hereby incorporated by reference in their entireties.

TECHNICAL FIELD

This application relates to the field of artificial intelligence, and more specifically, to an image classification method and apparatus.

BACKGROUND

Computer vision is an integral part of various intelligent/autonomic systems in various application fields, such as manufacturing industry, inspection, document analysis, medical diagnosis, and military affairs. The computer vision is knowledge about how to use a camera/video camera and a computer to obtain required data and information of a photographed subject. To be vivid, eyes (the camera/video camera) and a brain (an algorithm) are mounted on the computer to replace human eyes to recognize, track, and measure a target, so that the computer can perceive an environment. The perceiving may be considered as extracting information from a perceptual signal. Therefore, the computer vision may also be considered as a science of studying how to enable an artificial system to perform "perceiving" in an image or multi-dimensional data. In conclusion, the computer vision is to replace a visual organ with various imaging systems to obtain input information, and then replace the brain with the computer to process and interpret the input information. An ultimate study objective of the computer vision is to enable the computer to observe and understand the world through vision in a way that human beings do, and to have a capability of autonomously adapting to the environment.

Image classification is a basis of various image processing applications. The computer vision often involves how to classify obtained images. With rapid development of artificial intelligence technologies, a convolutional neural network (convolutional neural network, CNN) based on deep learning is increasingly widely applied in image classification processing. However, both a quantity of parameters and a computation amount included in the convolutional neural network are excessively large.

Therefore, how to reduce operation overheads of the neural network becomes an urgent problem to be resolved.

SUMMARY

An image classification method and apparatus is provided. The method helps reduce a computation amount and a quantity of parameters of image classification processing.

According to a first aspect, an image classification method is provided. The method includes: obtaining an input feature map of a to-be-processed image; performing convolution processing on the input feature map based on M convolution kernels of a neural network, to obtain a candidate output feature map of M channels, where M is a positive integer; performing matrix transformation on the M channels of the candidate output feature map based on N matrices, to obtain an output feature map of N channels, where a quantity of channels of each of the N matrices is less than M, N is greater than M, and N is a positive integer; and classifying the to-be-processed image based on the output feature map, to obtain a classification result of the to-be-processed image.

Optionally, the M convolution kernels may be standard convolution kernels in an existing convolutional neural network.

It should be noted that, in this embodiment of this application, a quantity of channels of the standard convolution kernel is the same as a quantity of channels of the input feature map. For example, if the quantity of channels of the input feature map of the to-be-processed image is C, the quantity of channels of the standard convolution kernel in the existing convolutional neural network is also C. That is, the quantity of channels of the standard convolution kernel is the same as the quantity of channels of the input feature map, where C is a positive integer.

In this embodiment of this application, convolution processing is performed on the to-be-processed image by using a small quantity of standard convolution kernels (namely, the M convolution kernels), to obtain a small quantity of candidate feature maps, and the matrix transformation is performed on the small quantity of candidate feature maps to obtain a required output feature map. A quantity of standard convolution kernels is less than a quantity of standard convolution kernels in the existing convolutional neural network, and a quantity of channels of the matrix used in the matrix transformation is also less than the quantity of standard convolution kernels. Therefore, this helps reduce a computation amount and a quantity of parameters of a neural network model, thereby reducing a computation amount and a quantity of parameters of image classification processing.

Optionally, the quantity of channels of each of the N matrices may be 1, or the quantity of channels of each of the N matrices may be greater than 1.

With reference to the first aspect, in some implementations of the first aspect, the N matrices include M groups of convolution kernels, and the M groups of convolution kernels respectively correspond to the M channels of the candidate output feature map. The performing matrix transformation on the M channels of the candidate output feature map based on N matrices, to obtain an output feature map of N channels includes: performing convolution on a corresponding channel of the M channels of the candidate output feature map based on each of the M groups of convolution kernels, to obtain the output feature map of the N channels.

With reference to the first aspect, in some implementations of the first aspect, the performing convolution on a corresponding channel of the M channels of the candidate output feature map based on each of the M groups of convolution kernels, to obtain the output feature map of the N channels includes: performing, based on each of the M groups of convolution kernels, depthwise convolution on the corresponding channel of the M channels of the candidate output feature map, to obtain the output feature map of the N channels.

With reference to the first aspect, in some implementations of the first aspect, a convolution kernel in each of the M groups of convolution kernels is the same as a convolution kernel in another group of the M groups of convolution kernels.

With reference to the first aspect, in some implementations of the first aspect, the classifying the to-be-processed image based on the output feature map, to obtain a classification result of the to-be-processed image includes: performing feature splicing on the candidate output feature map and the output feature map to obtain a feature splicing feature map, where a quantity of channels of the feature splicing feature map is M+N; and classifying the to-be-processed image based on the feature splicing feature map, to obtain the classification result of the to-be-processed image.

Optionally, the foregoing feature splicing may mean that the candidate output feature map and the output feature map constitute a new feature map in a depth direction, namely, the foregoing feature splicing feature map.

For example, a quantity of channels of the candidate output feature map is M, a quantity of channels of the output feature map is N, and feature splicing may be performed on the candidate output feature map and the output feature map, to obtain a feature splicing feature map whose quantity of channels is M+N.

The feature splicing may introduce more details (or features) into the output feature map in a manner of identity feature mapping. In addition, an additional parameter or computation amount is not introduced through the identity mapping. Therefore, when the parameter amount and the computation amount are not increased, an image classification effect is improved.

According to a second aspect, an image classification method is provided. The method includes: obtaining an input feature map of a to-be-processed image; performing convolution processing on the input feature map based on M first convolution kernels of a neural network, to obtain a first candidate output feature map of M channels, where M is a positive integer; performing matrix transformation on the first candidate output feature map of the M channels based on K first matrices, to obtain a first output feature map of K channels, where a quantity of channels of each of the K first matrices is less than M, K is greater than M, and K is a positive integer; performing convolution processing on the first output feature map based on P second convolution kernels of the neural network, to obtain a second candidate output feature map of P channels, where P is a positive integer; performing matrix transformation on the second candidate output feature map of the P channels based on N second matrices, to obtain a second output feature map of N channels, where a quantity of channels of each of the N second matrices is less than P, N is greater than P, and N is a positive integer; and classifying the to-be-processed image based on the second output feature map, to obtain a classification result of the to-be-processed image.

Optionally, the M first convolution kernels may be standard convolution kernels in an existing convolutional neural network.

It should be noted that, in this embodiment of this application, a quantity of channels of the standard convolution kernel is the same as a quantity of channels of the input feature map. For example, if the quantity of channels of the input feature map of the to-be-processed image is C, the quantity of channels of the standard convolution kernel in the existing convolutional neural network is also C. That is, the quantity of channels of the standard convolution kernel is the same as the quantity of channels of the input feature map, where C is a positive integer.

Similarly, the P second convolution kernels may also be standard convolution kernels in the existing convolutional neural network.

In this embodiment of this application, convolution processing in the existing convolutional neural network is implemented by using a small quantity of standard convolution kernels and based on the matrix transformation. This can effectively reduce redundancy between output feature maps, and reduce a computation amount and a quantity of parameters of a neural network model, thereby reducing a computation amount and a quantity of parameters of image classification processing. Therefore, in the image classification method in this embodiment of this application, an image classification effect can be improved without increasing the quantity of parameters and the computation amount (or reducing the quantity of parameters and the computation amount).

Optionally, the quantity of channels of each of the K first matrices may be 1, or the quantity of channels of each of the K first matrices may be greater than 1.

Optionally, the quantity of channels of each of the N second matrices may be 1, or the quantity of channels of each of the N second matrices may be greater than 1.

With reference to the second aspect, in some implementations of the second aspect, the performing convolution processing on the first output feature map based on P second convolution kernels of the neural network, to obtain a second candidate output feature map of P channels includes: performing depthwise convolution on the first output feature map to obtain a depthwise convolutional feature map; and performing convolution processing on the depthwise convolutional feature map based on the P second convolution kernels, to obtain the second candidate output feature map.

With reference to the second aspect, in some implementations of the second aspect, the performing depthwise convolution on the first output feature map to obtain a depthwise convolutional feature map includes: performing depthwise convolution on the first output feature map with a stride length greater than 1, to obtain the depthwise convolutional feature map.

With reference to the second aspect, in some implementations of the second aspect, the classifying the to-be-processed image based on the second output feature map, to obtain a classification result of the to-be-processed image includes: performing residual connection on the input feature map and the second output feature map to obtain a residual connection feature map; and classifying the to-be-processed image based on the residual connection feature map, to obtain the classification result of the to-be-processed image.

In this embodiment of this application, more details (or features) may be introduced into the output feature map through the residual connection. In addition, an additional parameter or computation amount is not introduced through the residual connection. Therefore, when the quantity of parameters and the computation amount are not increased, the image classification effect is improved.

According to a third aspect, an image classification apparatus is provided, including: an obtaining unit, configured to obtain an input feature map of a to-be-processed image; a convolution unit, configured to perform convolution processing on the input feature map based on M convolution kernels of a neural network, to obtain a candidate output feature map of M channels, where M is a positive integer; a matrix transformation unit, configured to perform matrix transformation on the M channels of the candidate output feature map based on N matrices, to obtain an output feature map of N channels, where a quantity of channels of each of the N matrices is less than M, N is greater than M, and N is a positive integer; and a classification unit, configured to classify the to-be-processed image based on the output feature map, to obtain a classification result of the to-be-processed image.

Optionally, the M convolution kernels may be standard convolution kernels in an existing convolutional neural network.

It should be noted that, in this embodiment of this application, a quantity of channels of the standard convolution kernel is the same as a quantity of channels of the input feature map. For example, if the quantity of channels of the input feature map of the to-be-processed image is C, the quantity of channels of the standard convolution kernel in the existing convolutional neural network is also C. That is, the quantity of channels of the standard convolution kernel is the same as the quantity of channels of the input feature map, where C is a positive integer.

In this embodiment of this application, convolution processing is performed on the to-be-processed image by using a small quantity of standard convolution kernels (namely, the M convolution kernels), to obtain a small quantity of candidate feature maps, and the matrix transformation is performed on the small quantity of candidate feature maps to obtain a required output feature map. A quantity of standard convolution kernels is less than a quantity of standard convolution kernels in the existing convolutional neural network, and a quantity of channels of the matrix used in the matrix transformation is also less than the quantity of standard convolution kernels. Therefore, this helps reduce a computation amount and a quantity of parameters of a neural network model, thereby reducing a computation amount and a quantity of parameters of image classification processing.

Optionally, the quantity of channels of each of the N matrices may be 1, or the quantity of channels of each of the N matrices may be greater than 1.

With reference to the third aspect, in some implementations of the third aspect, the N matrices include M groups of convolution kernels, and the M groups of convolution kernels respectively correspond to the M channels of the candidate output feature map. The matrix transformation unit is specifically configured to perform convolution on a corresponding channel of the M channels of the candidate output feature map based on each of the M groups of convolution kernels, to obtain the output feature map of the N channels.

With reference to the third aspect, in some implementations of the third aspect, the matrix transformation unit is specifically configured to perform, based on each of the M groups of convolution kernels, depthwise convolution on the corresponding channel of the M channels of the candidate output feature map, to obtain the output feature map of the N channels.

With reference to the third aspect, in some implementations of the third aspect, a convolution kernel in each of the M groups of convolution kernels is the same as a convolution kernel in another group of the M groups of convolution kernels.

With reference to the third aspect, in some implementations of the third aspect, the classification unit is specifically configured to perform feature splicing on the candidate output feature map and the output feature map to obtain a feature splicing feature map, where a quantity of channels of the feature splicing feature map is M+N; and classify the to-be-processed image based on the feature splicing feature map, to obtain the classification result of the to-be-processed image.

Optionally, the foregoing feature splicing may mean that the candidate output feature map and the output feature map constitute a new feature map in a depth direction, namely, the foregoing feature splicing feature map.

For example, a quantity of channels of the candidate output feature map is M, a quantity of channels of the output feature map is N, and feature splicing may be performed on the candidate output feature map and the output feature map, to obtain a feature splicing feature map whose quantity of channels is M+N.

The feature splicing may introduce more details (or features) into the output feature map in a manner of identity feature mapping. In addition, an additional parameter or computation amount is not introduced through the identity mapping. Therefore, when the quantity of parameters and the computation amount are not increased, an image classification effect is improved.

According to a fourth aspect, an image classification apparatus is provided, including: an obtaining unit, configured to obtain an input feature map of a to-be-processed image; a first convolution unit, configured to perform convolution processing on the input feature map based on M first convolution kernels of a neural network, to obtain a first candidate output feature map of M channels, where M is a positive integer; a first matrix transformation unit, configured to perform matrix transformation on the first candidate output feature map of the M channels based on K first matrices, to obtain a first output feature map of K channels, where a quantity of channels of each of the K first matrices is less than M, K is greater than M, and K is a positive integer; a second convolution unit, configured to perform convolution processing on the first output feature map based on P second convolution kernels of the neural network, to obtain a second candidate output feature map of P channels, where P is a positive integer; a second matrix transformation unit, configured to perform matrix transformation on the second candidate output feature map of the P channels based on N second matrices, to obtain a second output feature map of N channels, where a quantity of channels of each of the N second matrices is less than P, N is greater than P, and N is a positive integer; and a classification unit, configured to classify the to-be-processed image based on the second output feature map, to obtain a classification result of the to-be-processed image.

Optionally, the M first convolution kernels may be standard convolution kernels in an existing convolutional neural network.

It should be noted that, in this embodiment of this application, a quantity of channels of the standard convolution kernel is the same as a quantity of channels of the input feature map. For example, if the quantity of channels of the input feature map of the to-be-processed image is C, the quantity of channels of the standard convolution kernel in the existing convolutional neural network is also C. That is, the quantity of channels of the standard convolution kernel is the same as the quantity of channels of the input feature map, where C is a positive integer.

Similarly, the P second convolution kernels may also be standard convolution kernels in the existing convolutional neural network.

In this embodiment of this application, convolution processing in the existing convolutional neural network is implemented by using a small quantity of standard convolution kernels and based on the matrix transformation. This can effectively reduce redundancy between output feature maps, and reduce a computation amount and a quantity of parameters of a neural network model, thereby reducing a computation amount and a quantity of parameters of image classification processing. Therefore, in the image classification method in the embodiment of this application, an image classification effect can be improved without increasing the quantity of parameters and the computation amount (or reducing the quantity of parameters and the computation amount).

Optionally, the quantity of channels of each of the K first matrices may be 1, or the quantity of channels of each of the K first matrices may be greater than 1.

Optionally, the quantity of channels of each of the N second matrices may be 1, or the quantity of channels of each of the N second matrices may be greater than 1.

With reference to the fourth aspect, in some implementations of the fourth aspect, the image classification apparatus further includes a depthwise convolution unit, configured to perform depthwise convolution on the first output feature map to obtain a depthwise convolutional feature map. The second convolution unit is specifically configured to perform convolution processing on the depthwise convolutional feature map based on the P second convolution kernels, to obtain the second candidate output feature map.

With reference to the fourth aspect, in some implementations of the fourth aspect, the depthwise convolution unit is specifically configured to perform depthwise convolution on the first output feature map with a stride length greater than 1, to obtain the depthwise convolutional feature map.

With reference to the fourth aspect, in some implementations of the fourth aspect, the image classification apparatus further includes a residual connection unit, configured to perform residual connection on the input feature map and the second output feature map to obtain a residual connection feature map. The classification unit is specifically configured to classify the to-be-processed image based on the residual connection feature map, to obtain the classification result of the to-be-processed image.

In this embodiment of this application, more details (or features) may be introduced into the output feature map through the residual connection. In addition, an additional parameter or computation amount is not introduced through the residual connection. Therefore, when the quantity of parameters and the computation amount are not increased, the image classification effect is improved.

According to a fifth aspect, an image classification apparatus is provided. The apparatus includes: a memory, configured to store a program; and a processor, configured to execute the program stored in the memory. When the program stored in the memory is executed, the processor is configured to perform the method according to any implementation of the first aspect or the second aspect.

The processor in the fifth aspect may be a central processing unit (central processing unit, CPU), or may be a combination of a CPU and a neural network operation processor. The neural network operation processor herein may include a graphics processing unit (graphics processing unit, GPU), a neural processing unit (neural-network processing unit, NPU), a tensor processing unit (tensor processing unit, TPU), and the like. The TPU is an artificial intelligence accelerator-specific integrated circuit customized by Google (Google) for machine learning.

According to a sixth aspect, a computer-readable medium is provided. The computer-readable medium stores program code to be executed by a device, and the program code is used to perform the method in any implementation of the first aspect or the second aspect.

According to a seventh aspect, a computer program product including an instruction is provided. When the computer program product runs on a computer, the computer is enabled to perform the method in any implementation of the first aspect or the second aspect.

According to an eighth aspect, a chip is provided. The chip includes a processor and a data interface. The processor performs the method in any implementation of the first aspect or the second aspect by reading, through the data interface, an instruction stored in a memory.

Optionally, in an implementation, the chip may further include the memory, and the memory stores the instruction. The processor is configured to execute the instruction stored in the memory, and when the instruction is executed, the processor is configured to perform the method in any implementation of the first aspect or the second aspect.

The foregoing chip may specifically be a field-programmable gate array (field-programmable gate array, FPGA) or an application-specific integrated circuit (application-specific integrated circuit, ASIC).

According to a ninth aspect, an electronic device is provided. The electronic device includes the image classification apparatus in any one of the third aspect or the fourth aspect.

When the electronic device includes the image classification apparatus in any one of the third aspect or the fourth aspect, the electronic device may be specifically a terminal device or a server.

In the embodiments of this application, the convolution processing is performed on the to-be-processed image by using the small quantity of the standard convolution kernels (namely, the M convolution kernels), to obtain the small quantity of candidate feature maps, and the matrix transformation is performed on the small quantity of candidate feature maps to obtain the required output feature map. The quantity of the standard convolution kernels is less than the quantity of the standard convolution kernels in the existing convolutional neural network, and the quantity of channels of the matrix used in the matrix transformation is also less than the quantity of the standard convolution kernels. Therefore, this helps reduce the computation amount and the quantity of parameters of the neural network model, thereby reducing the computation amount and the quantity of parameters of image classification processing.

DESCRIPTION OF EMBODIMENTS

Figure 1:
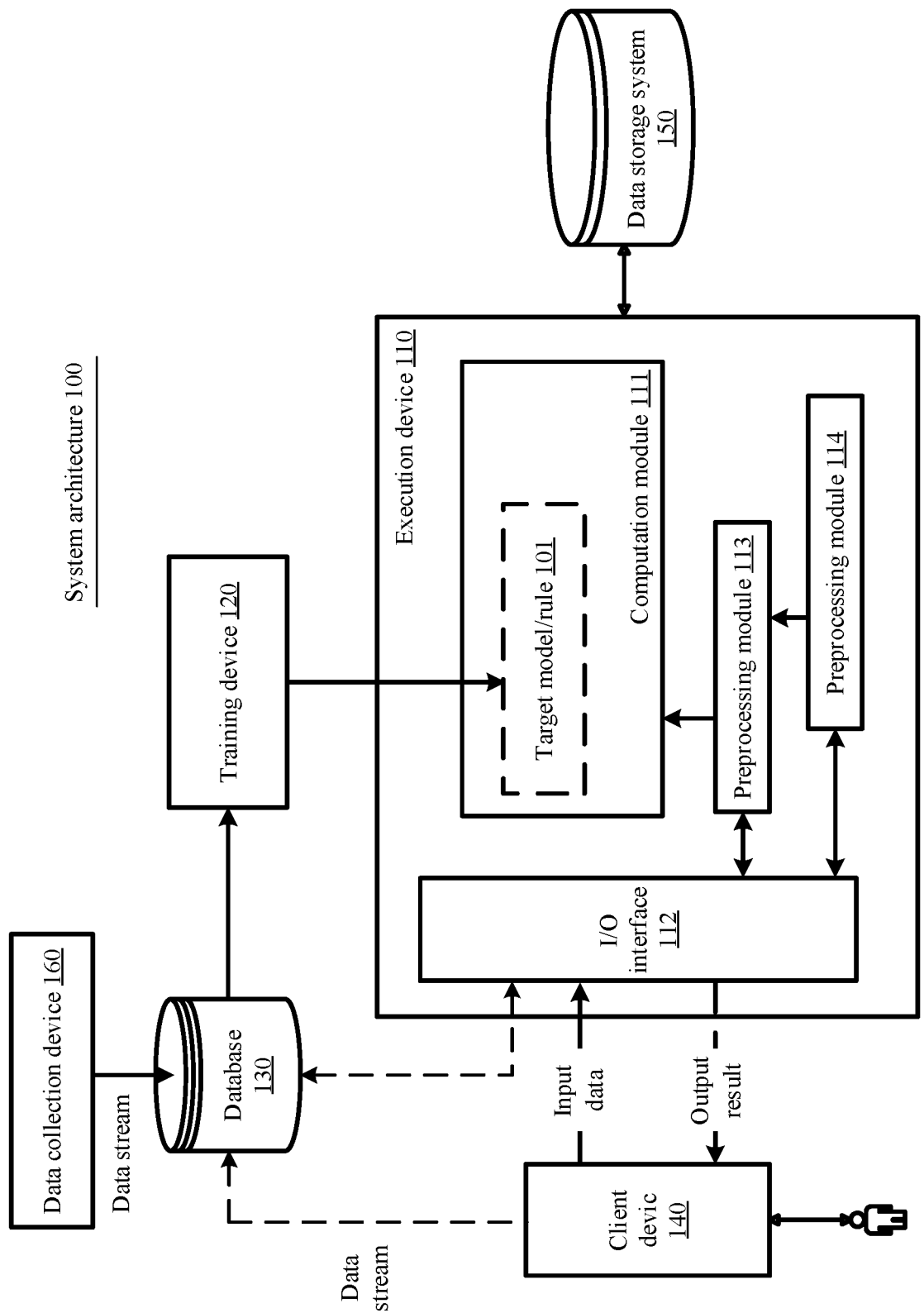
FIG. 1 is a schematic structural diagram of a system architecture according to an embodiment of this application.

The following describes technical solutions of this application with reference to accompanying drawings.

An image classification method provided in embodiments of this application can be applied to image retrieval, album management, Safe City, human-computer interaction, and another scenario in which image classification or image recognition needs to be performed. It should be understood that an image in this embodiment of this application may be a static image (or referred to as a static picture) or a dynamic image (or referred to as a dynamic picture). For example, the image in this application may be a video or a dynamic picture, or the image in this application may be a static picture or photo. For ease of description, in the following embodiments of this application, the static image or the dynamic image is collectively referred to as the image.

The image classification method in the embodiments of this application may specifically be applied to an album classification scenario and a photographing recognition scenario. The following describes the two scenarios in detail.

Album Classification Scenario:

A user stores a large quantity of pictures on a mobile phone and a cloud disk. Managing an album by category can improve user experience. Pictures in the album are classified by using the image classification method in the embodiments of this application, so that an album that is arranged or stored by category can be obtained. According to the image classification method in the embodiments of this application, the user can conveniently manage different object categories by category, thereby facilitating user search, saving management time of the user, and improving album management efficiency.

Specifically, when the album is classified by using the image classification method in the embodiments of this application, a neural network provided in this application may be used to first extract picture features of the pictures in the album, then classify the pictures in the album based on the extracted picture features, to obtain classification results of the pictures, and then classify the pictures in the album based on the classification results of the pictures, to obtain an album that is arranged according to picture categories. When the pictures in the album are arranged according to the picture categories, pictures belonging to a same category may be arranged in one row or one column. For example, in a finally obtained album, pictures in a first row all belong to an airplane, and pictures in a second row all belong to a car.

Photographing Recognition Scenario:

When taking a photo, a user may process the taken photo by using the image classification method in the embodiments of this application, so that a category of a photographed object can be automatically identified. For example, it can be automatically identified that the photographed object is a flower, an animal, or the like. Further, the image classification method in the embodiments of this application may be used to identify an object obtained through photographing, and identify a category to which the object belongs. For example, a photo obtained by the user through photographing includes a shared bicycle. The image classification method in the embodiments of this application is used to identify the shared bicycle. It is identified that the object is a bicycle, and further, related information of the bicycle may be displayed.

It should be understood that the album classification scenario and the photographing recognition scenario described above are merely two specific scenarios to which the image classification method in the embodiments of this application is applied. The image classification method in the embodiments of this application is not limited to the foregoing two scenarios during application, and the image classification method in the embodiments of this application can be applied to any scenario in which the image classification or the image recognition needs to be performed.

A new neural network model is used in the image classification method in the embodiments of this application. The model may also be similarly applied to another field in which the neural network is used, for example, facial recognition, speech recognition, target detection, machine translation, and semantic segmentation.

Embodiments of this application relate to a large quantity of neural network-related applications. To better understand the solutions in the embodiments of this application, the following first describes terms and concepts that are related to the neural network and that may be used in the embodiments of this application.

(1) Neural Network

The neural network may include a neuron. The neuron may be an operation unit that uses $x_s$ and an intercept 1 as inputs, and an output of the operation unit may be shown in the formula (1-1):

$$h_{W,b}(x) = f(W^T x) = f(\Sigma_{s=1}^{n} W_s x_s + b) \quad (1\text{-}1)$$

s=1, 2, ..., or n, n is a natural number greater than 1, $W_s$ is a weight of $x_s$, and b is bias of the neuron. f is an activation function (activation function) of the neuron, and the activation function is used to introduce a non-linear feature into the neural network, to convert an input signal in the neuron into an output signal. The output signal of the activation function may be used as an input of a next-layer convolutional layer, and the activation function may be a sigmoid function. The neural network is a network constituted by connecting a plurality of single neurons together. To be specific, an output of a neuron may be an input of another neuron. An input of each neuron may be connected to a local receptive field of a previous layer to extract a feature of the local receptive field. The local receptive field may be a region including several neurons.

(2) Deep Neural Network

The deep neural network (deep neural network, DNN) is also referred to as a multi-layer neural network, and may be understood as a neural network having a plurality of hidden layers. The DNN is divided based on locations of different layers, and a neural network in the DNN may be divided into three types: an input layer, a hidden layer, and an output layer. Generally, the first layer is the input layer, the last layer is the output layer, and the middle layer is the hidden layer. Layers are fully connected. To be specific, any neuron at the $i^{th}$ layer is certainly connected to any neuron at the $(i+1)^{th}$ layer.

Although the DNN looks to be complex, the DNN is actually not complex in terms of work at each layer, and is simply expressed as the following linear relationship expression: $\vec{y} = \alpha(W \cdot \vec{x} + \vec{b})$, where $\vec{x}$ is an input vector, $\vec{y}$ is an output vector, $\vec{b}$ is a bias vector, W is a weight matrix (also referred to as a coefficient), and α( ) is an activation function. At each layer, the output vector $\vec{x}$ is obtained by performing such a simple operation on the input vector $\vec{y}$. Because there are a large quantity of layers in the DNN, there are also a relatively large quantity of coefficients W and bias vectors $\vec{b}$. Definitions of these parameters in the DNN are as follows: The coefficient W is used as an example. It is assumed that in a DNN having three layers, a linear coefficient from the fourth neuron at the second layer to the second neuron at the third layer is defined as $W_{24}^3$. The superscript 3 represents a layer at which the coefficient W is located, and the subscript corresponds to an output third-layer index 2 and an input second-layer index 4.

In conclusion, a coefficient from the $k^{th}$ neuron at the $(L-1)^{th}$ layer to the $j^{th}$ neuron at the Lth layer is defined as $W_{jk}^L$.

It should be noted that there is no parameter W at the input layer. In the deep neural network, more hidden layers make the network more capable of describing a complex case in the real world. Theoretically, a model with a larger quantity of parameters indicates higher complexity and a larger "capacity", and indicates that the model can complete a more complex learning task. Training the deep neural network is a process of learning a weight matrix, and a final objective of the training is to obtain a weight matrix of all layers of the trained deep neural network (a weight matrix including vectors W at many layers).

(3) Convolutional Neural Network

The convolutional neural network (convolutional neuron network, CNN) is a deep neural network with a convolutional structure. The convolutional neural network includes a feature extractor including a convolution layer and a sub-sampling layer. The feature extractor may be considered as a filter. The convolutional layer is a neuron layer that is in the convolutional neural network and at which convolution processing is performed on an input signal. At the convolutional layer of the convolutional neural network, one neuron may be connected only to some adjacent-layer neurons. A convolutional layer usually includes several feature planes, and each feature plane may include some neurons arranged in a rectangular form. Neurons on a same feature plane share a weight. The shared weight herein is a convolution kernel. Weight sharing may be understood as that an image information extraction manner is irrelevant to a location. The convolution kernel may be initialized in a form of a random-size matrix. In a process of training the convolutional neural network, the convolution kernel may obtain an appropriate weight through learning. In addition, a direct benefit brought by weight sharing is that connections between layers of the convolutional neural network are reduced and an overfitting risk is lowered.

(4) A recurrent neural network (recurrent neural network, RNN) is used to process sequence data. In a conventional neural network model, from an input layer to a hidden layer and then to an output layer, the layers are fully connected, and nodes at each layer are not connected. Such a common neural network resolves many difficult problems, but is still incapable of resolving many other problems. For example, if a word in a sentence is to be predicted, a previous word usually needs to be used, because adjacent words in the sentence are not independent. A reason why the RNN is referred to as the recurrent neural network is that a current output of a sequence is also related to a previous output of the sequence. A specific representation form is that the network memorizes previous information and applies the previous information to computation of the current output. To be specific, nodes at the hidden layer are connected, and an input of the hidden layer not only includes an output of the input layer, but also includes an output of the hidden layer at a previous moment. Theoretically, the RNN can process sequence data of any length. Training for the RNN is the same as training for a conventional CNN or DNN.

Now that there is the convolutional neural network, why is the recurrent neural network required? A reason is simple. In the convolutional neural network, it is assumed that elements are independent of each other, and an input and an output are also independent, such as a cat and a dog. However, in the real world, many elements are interconnected. For example, stocks change with time. For another example, a person says: I like travelling, and my favorite place is Yunnan. I will go if there is a chance. If there is bank filling, people should know that "Yunnan" will be filled in the blank. A reason is that the people can deduce the answer based on content of the context. However, how can a machine do this? The RNN emerges. The RNN is intended to make the machine capable of memorizing like a human. Therefore, an output of the RNN needs to depend on current input information and historical memorized information.

(5) Loss Function

In a process of training the deep neural network, because it is expected that an output of the deep neural network maximally approximates a value that actually needs to be predicted, a current predicted value of the network and an actually desired target value may be compared, and then a weight vector of each neural network layer is updated based on a difference between the current predicted value and the target value (certainly, there is usually an initialization process before the first update, to be specific, parameters are preconfigured for all layers of the deep neural network). For example, if the predicted value of the network is large, the weight vector is adjusted to lower the predicted value until the deep neural network can predict the actually desired target value or a value that more approximates to the actually desired target value. Therefore, "how to obtain, through comparison, a difference between a predicted value and a target value" needs to be predefined. This is the loss function (loss function) or an objective function (objective function). The loss function and the objective function are important equations used to measure the difference between the predicted value and the target value. The loss function is used as an example. A higher output value (loss) of the loss function indicates a larger difference. Therefore, training of the deep neural network is a process of minimizing the loss as much as possible.

(6) Back Propagation Algorithm

The neural network may correct a value of a parameter in an initial neural network model in a training process by using an error back propagation (back propagation, BP) algorithm, so that an error loss of reconstructing the neural network model becomes small. Specifically, an input signal is transferred forward until an error loss occurs at an output, and the parameter in the initial neural network model is updated based on back propagation error loss information, to make the error loss converge. The back propagation algorithm is an error-loss-centered back propagation motion intended to obtain a parameter, such as a weight matrix, of an optimal neural network model.

(7) Pixel Value

A pixel value of an image may be a red green blue (RGB) color value, and the pixel value may be a long integer representing a color. For example, the pixel value is 256*Red+100*Green+76Blue, where Blue represents a blue component, Green represents a green component, and Red represents a red component. In each color component, a smaller value indicates lower brightness, and a larger value indicates higher brightness. For a grayscale image, a pixel value may be a grayscale value.

As shown in FIG. 1, an embodiment of this application provides a system architecture 100. In FIG. 1, a data collection device 160 is configured to collect training data. For the image classification method in the embodiments of this application, the training data may include a training image and a classification result corresponding to the training image, and the classification result of the training image may be a result of manual pre-labeling.

After collecting the training data, the data collection device 160 stores the training data in a database 130. A training device 120 performs training based on the training data maintained in the database 130, to obtain a target model/rule 101.

The following describes the target model/rule 101 obtained by the training device 120 based on the training data. The training device 120 processes an input original image, and compares an output image with the original image until a difference between the image output by the training device 120 and the original image is less than a specific threshold. In this way, training of the target model/rule 101 is completed.

The target model/rule 101 can be used to implement the image classification method in the embodiments of this application. To be specific, related preprocessing is performed on a to-be-processed image, and then the processed image is input to the target model/rule 101, to obtain a classification result of the image. The target model/rule 101 in this embodiment of this application may specifically be a neural network. It should be noted that, in an actual application, the training data maintained in the database 130 is not necessarily all collected by the data collection device 160, and may be received from another device. In addition, it should be noted that the training device 120 may not train the target model/rule 101 entirely based on the training data maintained in the database 130, but may obtain training data from a cloud or another place to perform model training. The foregoing description shall not be construed as a limitation on this embodiment of this application.

The target model/rule 101 obtained by the training device 120 through training may be applied to different systems or devices, for example, applied to an execution device 110 shown in FIG. 1. The execution device 110 may be a terminal, for example, a mobile phone terminal, a tablet computer, a notebook computer, an augmented reality (augmented reality, AR)/virtual reality (virtual reality, VR) terminal, or a vehicle-mounted terminal, or may be a server, a cloud device, or the like. In FIG. 1, the execution device 110 is provided with an input/output (input/output, I/O) interface 112, and is configured to exchange data with an external device. A user may input data to the I/O interface 112 by using a client device 140. The input data in this embodiment of this application may include a to-be-processed image input by using the client device.

A preprocessing module 113 and a preprocessing module 114 are configured to perform preprocessing based on the input data (for example, the to-be-processed image) received by the I/O interface 112. In this embodiment of this application, the preprocessing module 113 and the preprocessing module 114 may not exist (or only one of the preprocessing module 113 and the preprocessing module 114 exists). A computation module 111 is directly configured to process the input data.

In a process in which the execution device 110 preprocesses the input data, or in a process in which the computation module 111 of the execution device 110 performs related processing, for example, computation, the execution device 110 may invoke data, code, and the like in a data storage system 150 for corresponding processing, and may further store, in the data storage system 150, data, an instruction, and the like that are obtained through the corresponding processing.

Finally, the I/O interface 112 returns a processing result, for example, the obtained classification result of the to-be-processed image, to the customer device 140, to provide the processing result for the user.

It should be noted that the training device 120 may generate corresponding target models/rules 101 for different targets or different tasks based on different training data. The corresponding target models/rules 101 may be used to implement the foregoing targets or complete the foregoing tasks, to provide a desired result for the user.

In a case shown in FIG. 1, the user may manually provide the input data. The manually providing may be performed by using a screen provided on the I/O interface 112. In another case, the client device 140 may automatically send the input data to the I/O interface 112. If it is required that the client device 140 needs to obtain authorization from the user to automatically send the input data, the user may set corresponding permission on the client device 140. The user may view, on the client device 140, a result output by the execution device 110. Specifically, the result may be presented in a form of displaying, a sound, an action, or the like. The client device 140 may alternatively be used as a data collection end to collect the input data that is input into the I/O interface 112 and an output result that is output from the I/O interface 112 in the figure, use the input data and the output result as new sample data, and store the new sample data in the database 130. Certainly, the client device 140 may alternatively not perform collection, but the I/O interface 112 directly stores, in the database 130 as new sample data, the input data that is input into the I/O interface 112 and an output result that is output from the I/O interface 112 in the figure.

It should be noted that FIG. 1 is merely a schematic diagram of a system architecture according to an embodiment of this application. A location relationship between the devices, the components, the modules, and the like shown in the figure does not constitute any limitation. For example, in FIG. 1, the data storage system 150 is an external memory relative to the execution device 110, but in another case, the data storage system 150 may alternatively be disposed in the execution device 110.

As shown in FIG. 1, the target model/rule 101 is obtained by the training device 120 through training. The target model/rule 101 in this embodiment of this application may be the neural network in this application. Specifically, the neural network provided in this embodiment of this application may be a CNN, a deep convolutional neural network (deep convolutional neural networks, DCNN), a recurrent neural network (recurrent neural network, RNN), and the like.

Because the CNN is a very common neural network, a structure of the CNN is mainly described in detail below with reference to FIG. 2. As described in the foregoing basic concept, the convolutional neural network is a deep neural network having a convolutional structure, and is a deep learning (deep learning) architecture. The deep learning architecture refers to learning of a plurality of layers at different abstract levels according to a machine learning algorithm. As a deep learning architecture, the CNN is a feed-forward (feed-forward) artificial neural network. Neurons in the feed-forward artificial neural network may respond to an image input to the CNN.

Figure 2:
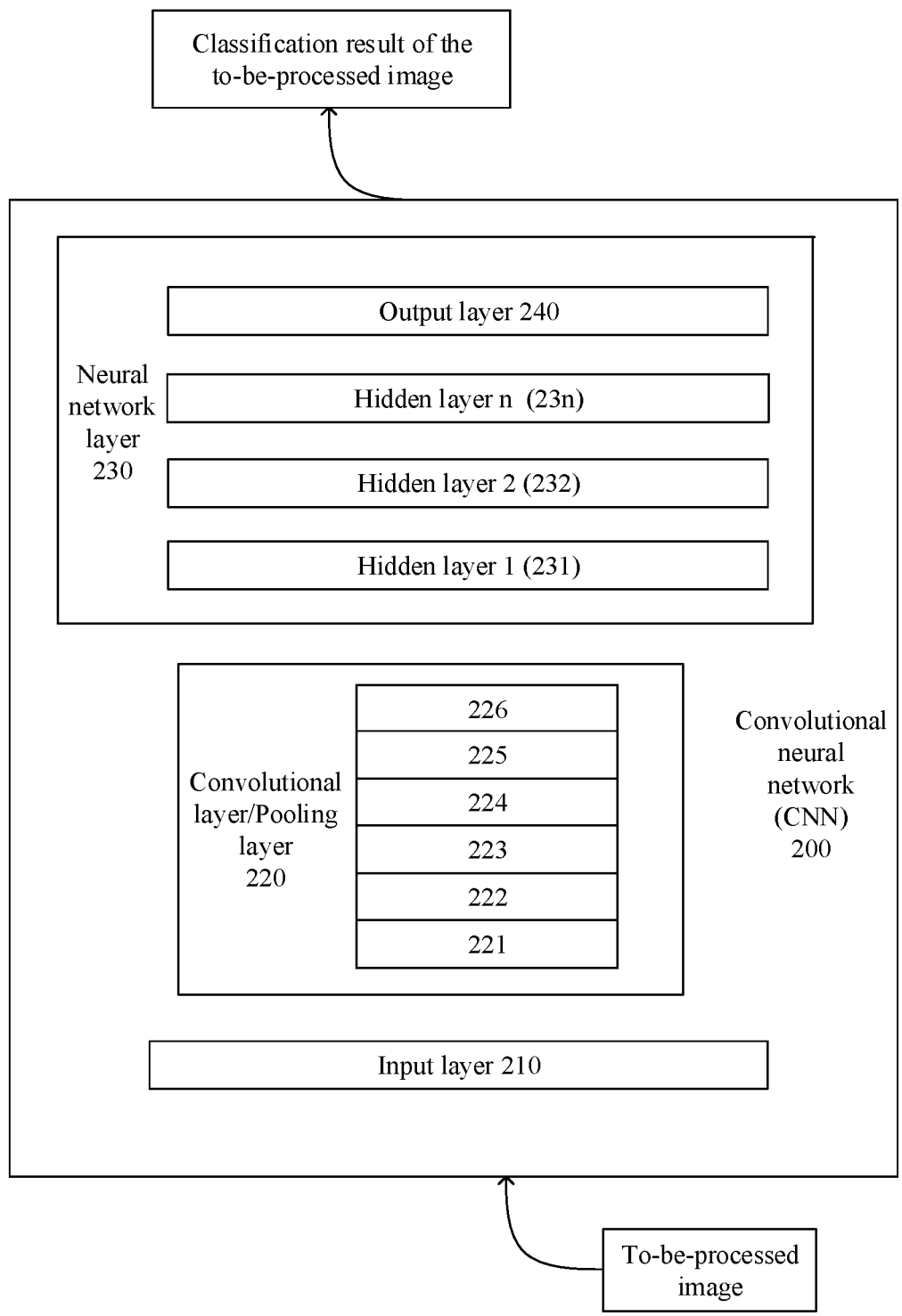
FIG. 2 is a schematic diagram of image classification based on a convolutional neural network model according to an embodiment of this application.

As shown in FIG. 2, a convolutional neural network (CNN) 200 may include an input layer 210, a convolutional layer/pooling layer 220 (where the pooling layer is optional), and a neural network layer 230. The following describes contents of these layers in detail.

Convolutional Layer/Pooling Layer 220:

Convolutional Layer:

As shown in FIG. 2, the convolutional layer/pooling layer 220 may include layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layers 221 and 222 are convolutional layers, the layer 223 is a pooling layer, the layers 224 and 225 are convolutional layers, and the layer 226 is a pooling layer. To be specific, an output of a convolutional layer may be used as an input of a subsequent pooling layer, or may be used as an input of another convolutional layer to continue to perform a convolution operation.

The following uses the convolutional layer 221 as an example to describe an internal working principle of one convolutional layer.

The convolutional layer 221 may include a plurality of convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity level of one pixel (or two pixels, depending on a value of a stride (stride) length) in a horizontal direction on the input image, to extract a specific feature from the image. A size of the weight matrix should be related to a size of the image. It should be noted that a depth dimension (depth dimension) of the weight matrix is the same as a depth dimension of the input image. During a convolution operation, the weight matrix extends to an entire depth of the input image. Therefore, a convolutional output of a single depth dimension is generated through convolution with a single weight matrix. However, in most cases, a single weight matrix is not used, but a plurality of weight matrices with a same size (rows×columns), namely, a plurality of same-type matrices, are applied. Outputs of the weight matrices are stacked to form a depth dimension of a convolutional image. The dimension herein may be understood as being determined based on the foregoing "plurality". Different weight matrices may be used to extract different features from the image. For example, one weight matrix is used to extract edge information of the image, another weight matrix is used to extract a specific color of the image, and a further weight matrix is used to blur unneeded noise in the image. Sizes of the plurality of weight matrices (rows×columns) are the same. Sizes of feature maps extracted from the plurality of weight matrices with the same size are also the same, and then the plurality of extracted feature maps with the same size are combined to form an output of the convolution operation.

Weight values in these weight matrices need to be obtained through a lot of training in actual application. Each weight matrix formed by using the weight values obtained through training may be used to extract information from an input image, to enable the convolutional neural network 200 to perform correct prediction.

When the convolutional neural network 200 has a plurality of convolutional layers, a relatively large quantity of general features are usually extracted at an initial convolutional layer (for example, 221). The general feature may also be referred to as a low-level feature. As the depth of the convolutional neural network 200 increases, a feature extracted at a subsequent convolutional layer (for example, 226) becomes more complex, for example, a high-level semantic feature. A feature with higher semantics is more applicable to a to-be-resolved problem.

Convolutional Layer/Pooling Layer 220:

A quantity of training parameters often needs to be reduced. Therefore, a pooling layer often needs to be periodically introduced after a convolutional layer. For the layers 221 to 226 shown in 220 in FIG. 2, one convolutional layer may be followed by one pooling layer, or a plurality of convolutional layers may be followed by one or more pooling layers. During image processing, the pooling layer is only used to reduce a space size of the image. The pooling layer may include an average pooling operator and/or a maximum pooling operator, to perform sampling on the input image to obtain an image with a relatively small size. The average pooling operator may be used to calculate pixel values in the image in a specific range, to generate an average value. The average value is used as an average pooling result. The maximum pooling operator may be used to select a pixel with a maximum value in a specific range as a maximum pooling result. In addition, similar to that the size of the weight matrix at the convolutional layer needs to be related to the size of the image, an operator at the pooling layer also needs to be related to the size of the image. A size of a processed image output from the pooling layer may be less than a size of an image input to the pooling layer. Each pixel in the image output from the pooling layer represents an average value or a maximum value of a corresponding sub-region of the image input to the pooling layer.

Neural Network Layer 230:

After processing performed at the convolutional layer/pooling layer 220, the convolutional neural network 200 is not ready to output required output information. As described above, at the convolutional layer/pooling layer 220, only a feature is extracted, and parameters resulting from an input image are reduced. However, to generate final output information (required class information or other related information), the convolutional neural network 200 needs to use the neural network layer 230 to generate an output of one required class or outputs of a group of required classes. Therefore, the neural network layer 230 may include a plurality of hidden layers (231, 232, . . . , and 23$n$ shown in FIG. 2) and an output layer 240. Parameters included in the plurality of hidden layers may be obtained through pre-training based on related training data of a specific task type. For example, the task type may include image recognition, image classification, and super-resolution image reconstruction.

At the neural network layer 230, the plurality of hidden layers are followed by the output layer 240, namely, the last layer of the entire convolutional neural network 200. The output layer 240 has a loss function similar to a categorical cross entropy, and the loss function is specifically used to calculate a prediction error. Once forward propagation (propagation in a direction from 210 to 240, as shown in FIG. 2) of the entire convolutional neural network 200 is completed, reverse propagation (propagation in a direction from 240 to 210, as shown in FIG. 2) is started to update a weight value and a deviation of each layer mentioned above, to reduce a loss of the convolutional neural network 200 and an error between a result output by the convolutional neural network 200 by using the output layer and an ideal result.

It should be noted that the convolutional neural network 200 shown in FIG. 2 is merely an example convolutional neural network. In specific application, the convolutional neural network may alternatively exist in a form of another network model.

In this application, the convolutional neural network 200 shown in FIG. 2 may be used to process the to-be-processed image, to obtain the classification result of the to-be-processed image. As shown in FIG. 2, after the to-be-processed image is processed by the input layer 210, the convolutional layer/pooling layer 220, and the neural network layer 230, the classification result of the to-be-processed image is output.

Figure 3:
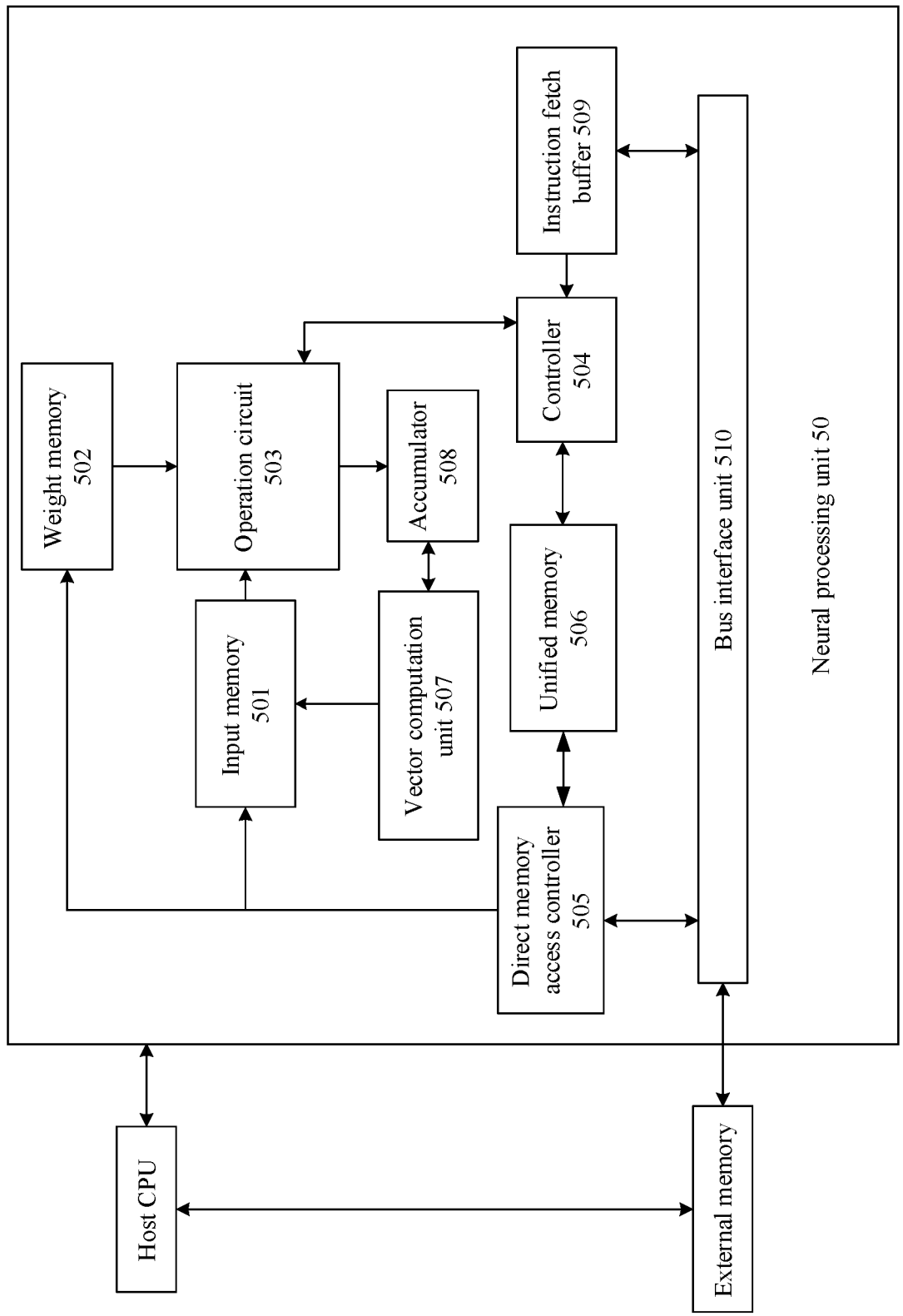
FIG. 3 is a schematic diagram of a hardware structure of a chip according to an embodiment of this application.

FIG. 3 shows a hardware structure of a chip according to an embodiment of this application, and the chip includes a neural processing unit 50. The chip may be disposed in the execution device 110 shown in FIG. 1, to complete computation work of the computation module 111. The chip may alternatively be disposed in the training device 120 shown in FIG. 1, to complete training work of the training device 120 and output the target model/rule 101. All algorithms of the layers in the convolutional neural network shown in FIG. 2 may be implemented in the chip shown in FIG. 3.

The neural processing unit NPU 50 serves as a coprocessor, and is mounted onto a host CPU (host CPU). The host CPU assigns a task. A core part of the NPU is an operation circuit 503, and a controller 504 controls the operation circuit 503 to extract data in a memory (a weight memory or an input memory) and perform an operation.

In some implementations, the operation circuit 503 internally includes a plurality of processing engines (process engine, PE). In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit 503 fetches data corresponding to the matrix B from the weight memory 502 and buffers the data in each PE of the operation circuit 503. The operation circuit 503 fetches data of the matrix A from an input memory 501, to perform a matrix operation on the matrix B, and stores an obtained partial result or an obtained final result of the matrix into an accumulator (accumulator) 508.

A vector computation unit 507 may perform further processing such as vector multiplication, vector addition, an exponent operation, a logarithm operation, or value comparison on an output of the operation circuit 503. For example, the vector computation unit 507 may be configured to perform network computation, such as pooling (pooling), batch normalization (batch normalization), or local response normalization (local response normalization) at a non-convolutional/non-FC layer in a neural network.

In some implementations, the vector computation unit 507 can store, in a unified memory 506, a processed output vector. For example, the vector computation unit 507 can apply a non-linear function to the output of the operation circuit 503, for example, a vector of an accumulated value, to generate an activated value. In some implementations, the vector computation unit 507 generates a normalized value, a combined value, or both. In some implementations, the processed output vector can be used as an activated input to the operation circuit 503, for example, for use in subsequent layers in the neural network.

The unified memory 506 is configured to store input data and output data.

For weight data, a direct memory access controller (direct memory access controller, DMAC) 505 transfers input data in an external memory to the input memory 501 and/or the unified memory 506, stores weight data in the external memory into the weight memory 502, and stores data in the unified memory 506 into the external memory.

A bus interface unit (bus interface unit, BIU) 510 is configured to implement interaction between the host CPU, the DMAC, and an instruction fetch buffer 509 through a bus.

The instruction fetch buffer (instruction fetch buffer) 509 connected to the controller 504 is configured to store an instruction used by the controller 504.

The controller 504 is configured to invoke the instruction buffered in the instruction fetch buffer 509, to control a working process of the operation accelerator.

Generally, the unified memory 506, the input memory 501, the weight memory 502, and the instruction fetch buffer 509 each are an on-chip (On-Chip) memory. The external memory is a memory outside the NPU. The external memory may be a double data rate synchronous dynamic random access memory (double data rate synchronous dynamic random access memory, DDR SDRAM for short), a high bandwidth memory (high bandwidth memory, HBM), or another readable and writable memory.

Operations at various layers in the convolutional neural network shown in FIG. 2 may be performed by the operation circuit 503 or the vector computation unit 307.

The execution device 110 in FIG. 1 described above can perform the steps of the image classification method in the embodiments of this application. A CNN model shown in FIG. 2 and the chip shown in FIG. 3 may also be configured to perform the steps of the image classification method in the embodiments of this application. The following describes in detail the image classification method in the embodiments of this application with reference to the accompanying drawings.

Figure 4:
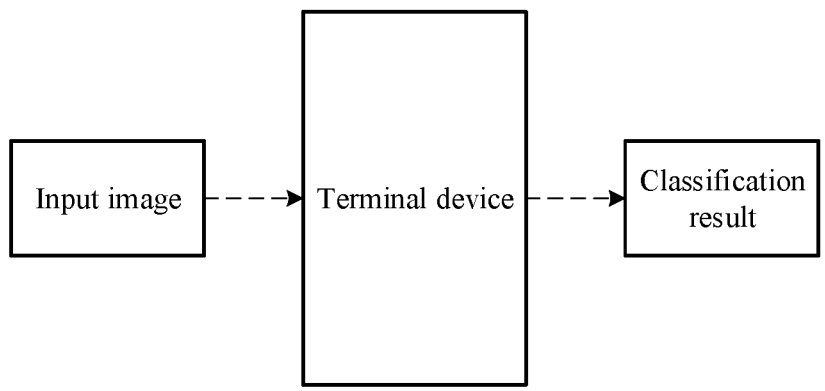
FIG. 4 is a schematic diagram of an application scenario according to an embodiment of this application.

The image classification method provided in the embodiments of this application may be performed on a server, may be performed on a cloud, or may be performed on a terminal device. The terminal device is used as an example. As shown in FIG. 4, the technical solution in this embodiment of the present application may be applied to the terminal device. In the image classification method in the embodiments of this application, image classification may be performed on an input image, to obtain a classification result of the input image. The terminal device may be mobile or fixed. For example, the terminal device may be a mobile phone having an image processing function, a tablet personal computer (tablet personal computer, TPC), a media player, a smart television, a laptop computer (laptop computer, LC), a personal digital assistant (personal digital assistant, PDA), a personal computer (personal computer, PC), a camera, a video camera, a smartwatch, a wearable device (wearable device, WD), an autonomous driving vehicle, or the like. The terminal device is not limited in this embodiment of the present application.

Image (or picture) classification is a basis of various image processing applications. Computer vision often involves how to classify obtained images. However, both a quantity of parameters and a computation amount of a high-precision convolutional neural network are large. Both a memory and computation resources of the terminal device are very limited, so that the terminal device does not have a relatively strong operation capability and a relatively strong cache capability. Consequently, it is difficult to deploy the high-precision convolutional neural network on the terminal device.

An embodiment of this application provides an image classification method. A required output feature map can be obtained by using a small quantity of standard convolution kernels less than a quantity of standard convolution kernels in an existing convolutional neural network. The method helps reduce a computation amount and a quantity of parameters of image classification processing.

Figure 5:
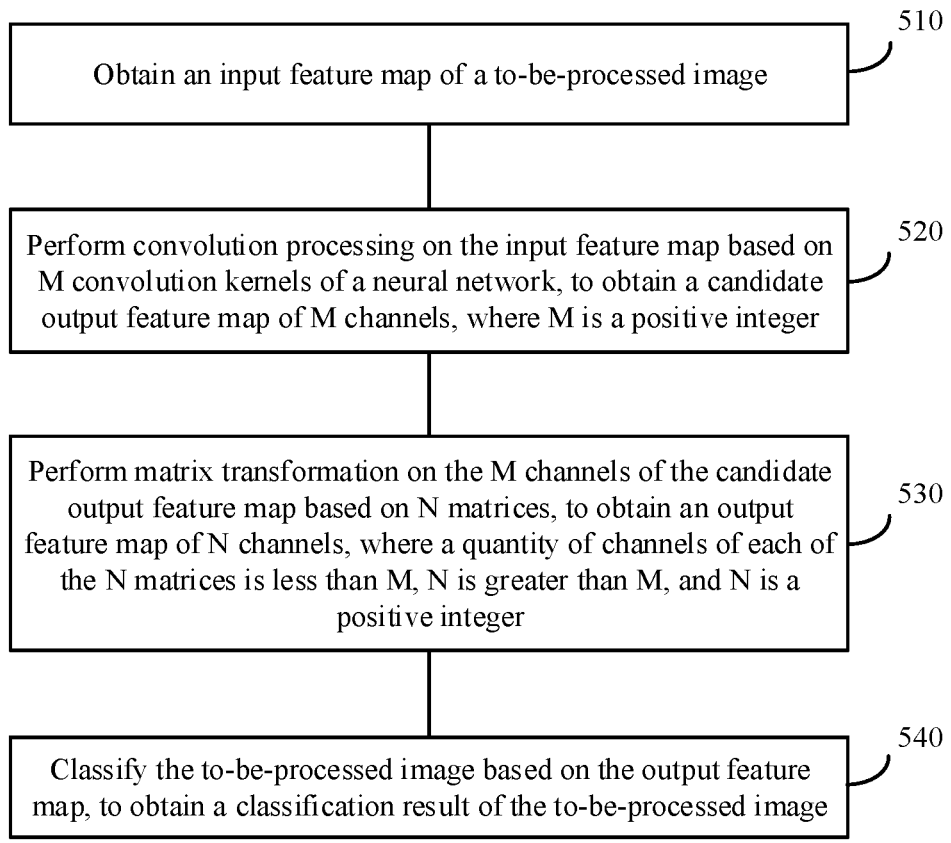
FIG. 5 is a schematic flowchart of an image classification method according to an embodiment of this application.

FIG. 5 is a schematic flowchart of an image classification method 500 according to an embodiment of this application. The method may be performed by an apparatus that can perform image classification. For example, the method may be performed by the terminal device in FIG. 4.

S510: Obtain an input feature map of a to-be-processed image.

When the method shown in FIG. 5 is performed by the terminal device in FIG. 4, the to-be-processed image may be an image photographed by the terminal device by using a camera, or the to-be-processed image may be an image obtained from inside the terminal device (for example, an image stored in an album of the terminal device, or an image obtained by the terminal device from a cloud).

Alternatively, the input feature map of the to-be-processed image may be a feature map obtained after processing at another layer in a convolutional neural network. It should be understood that the another layer in the convolutional neural network herein is a layer in the convolutional neural network. For example, the another layer may be one of an input layer, a convolutional layer, a pooling layer, or a fully connected layer in the convolutional neural network.

S520: Perform convolution processing on the input feature map based on M convolution kernels of a neural network, to obtain a candidate output feature map of M channels, where M is a positive integer.

The M convolution kernels may be standard convolution kernels in an existing convolutional neural network.

It should be noted that, in this embodiment of this application, a quantity of channels of the standard convolution kernel is the same as a quantity of channels of the input feature map. For example, if the quantity of channels of the input feature map of the to-be-processed image is C, the quantity of channels of the standard convolution kernel in the existing convolutional neural network is also C. That is, the quantity of channels of the standard convolution kernel is the same as the quantity of channels of the input feature map, where C is a positive integer.

S530: Perform matrix transformation on the M channels of the candidate output feature map based on N matrices, to obtain an output feature map of N channels.

A quantity of channels of each of the N matrices is less than M, N is greater than M, and N is a positive integer.

S520 and S530 are implemented by a feature augment unit (feature in feature, FiF) in this embodiment of this application. The feature augment unit may be configured to replace a convolutional layer in an existing convolutional neural network model.

The feature augment unit performs convolution processing by using a small quantity of standard convolution kernels, to obtain a small quantity of candidate feature maps, and performs the matrix transformation on the small quantity of candidate feature maps to obtain a required output feature map, so that redundancy between output feature maps can be reduced. This helps reduce a computation amount and a quantity of parameters of image classification processing. The following describes in detail the feature augment unit in S520 and S530 with reference to FIG. 6 and FIG. 7.

Figure 6:
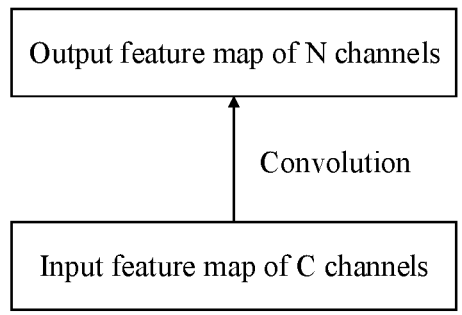
FIG. 6 is a schematic block diagram of convolution processing according to an embodiment of this application.

FIG. 6 shows convolution processing of one convolutional layer in the existing convolutional neural network.

It can be learned from FIG. 6 that an input feature map of the convolutional layer includes C channels, and an output feature map of the convolutional layer includes N channels. In the existing convolutional neural network, if convolution processing needs to be performed on the input feature map of the C channels to obtain the output feature map of the N channels, N standard convolution kernels are required at the convolution layer, and each of the N standard convolution kernels includes C channels.

It should be noted that the input feature map of the C channels may be one input feature map, and a quantity of channels in the input feature map is C. Alternatively, the input feature map of the C channels may be C input feature maps, and each input feature map is two-dimensional (to be specific, a quantity of channels is 1). For ease of understanding, the input feature map of the C channels is uniformly described in this application. A description of another feature map in this embodiment of this application may be similarly understood, and details are not described herein again.

For example, in S520, the candidate output feature map of the M channels is obtained. The candidate output feature map of the M channels may be considered as one candidate output feature map including the M channels, or may be M candidate output feature maps whose quantities of channels are all 1.

Figure 7:
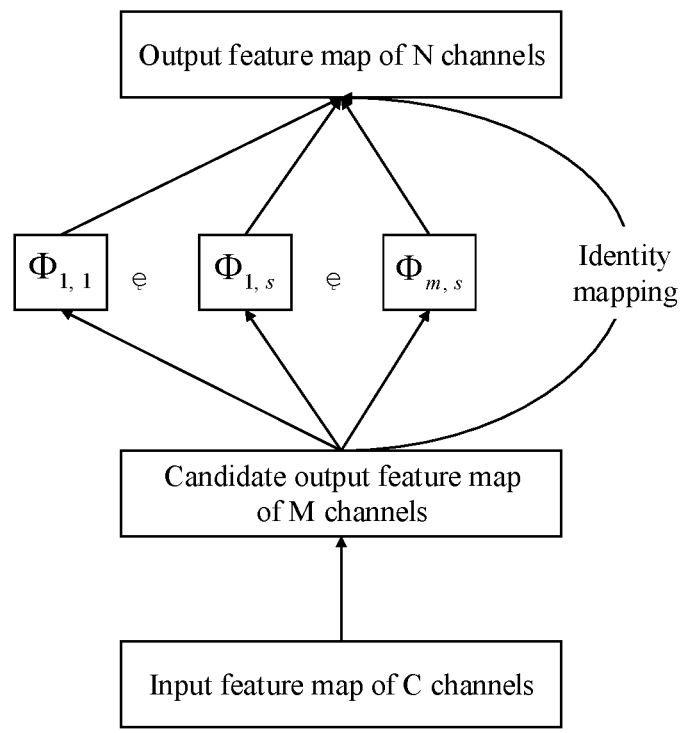
FIG. 7 is a schematic block diagram of a feature augment unit according to an embodiment of this application.

FIG. 7 shows feature augment processing of the feature augment unit according to an embodiment of this application. The feature augment unit may be configured to replace a convolutional layer (for example, the convolutional layer shown in FIG. 6) in the existing convolutional neural network.

In the feature augment unit shown in FIG. 7, when the input feature map includes C channels, if the output feature map of the N channels is expected to be obtained, convolution processing may be first performed by using M standard convolution kernels, to obtain the candidate output feature map of the M channels (for example, S520), where each of the M standard convolution kernels includes C channels. Then, the matrix transformation is performed on the M channels of the candidate output feature map based on the N matrices, to obtain the output feature map of the N channels (for example, S530). The quantity of channels of each of the N matrices may be less than M, N may be greater than M, and N is a positive integer.

In the existing convolutional neural network, there may be a large quantity of standard convolution kernels at a same convolution layer. Extraction modes of many convolution kernels are similar. In other words, extracted features are similar. Consequently, redundancy between obtained output feature maps is high. However, in this application, the feature augment unit performs convolution processing based on the small quantity of standard convolution kernels, and performs the matrix transformation on channels of the obtained small quantity of candidate feature maps, so that redundancy between the output feature maps can be effectively reduced.

In addition, a quantity of standard convolution kernels in the feature augment unit is less than the quantity of standard convolution kernels in the existing convolutional neural network, and a quantity of channels of the matrix used in the matrix transformation is also less than the quantity of standard convolution kernels. Therefore, this helps reduce a computation amount and a quantity of parameters of a neural network model, thereby reducing the computation amount and the quantity of parameters of the image classification processing.

In this application, the N matrices in the foregoing matrix transformation may be N matrices whose quantities of channels are all 1. Alternatively, the N matrices in the foregoing matrix transformation may be N matrices whose quantities of channels are all greater than 1. For example, the quantity of channels of each of the N matrices is 2.

In addition, in S530, the matrix transformation is performed on the feature map (the candidate output feature map of the M channels) based on the N matrices. Generally, a convolution kernel may also be considered as a matrix. Therefore, the N matrices may also be considered as N convolution kernels. In subsequent descriptions in FIG. 5, the N matrices may be understood as the N convolution kernels, and the N convolution kernels may also be the N matrices used to perform the matrix transformation on the candidate output feature map of the M channels.

It should be noted that the N convolution kernels (the foregoing N convolution kernels) described herein each are different from the convolution kernel in S520, and the convolution kernel in S520 is the standard convolution kernel in the existing convolutional neural network. The quantity of channels of the standard convolution kernel is the same as the quantity of channels of the input feature map on which convolution is performed. However, in this application, a quantity of channels of each of the N convolution kernels may be less than the quantity M of channels of the input feature map (namely, the candidate output feature map of the M channels) on which convolution is performed. For example, the quantity of channels of each of the N convolution kernels may be 1.

Further, because the quantity of channels of each of the N matrices (namely, the foregoing N convolution kernels) in the matrix transformation may be less than the quantity M of channels of the candidate output feature map, a computation amount and a quantity of parameters of the feature augment unit can be reduced. The feature augment unit is configured to replace the convolutional layer (for example, the convolutional layer shown in FIG. 6) in the existing convolutional neural network. This helps reduce the computation amount and the quantity of parameters of the neural network model, thereby reducing the computation amount and the quantity of parameters of the image classification processing.

In this application, there may be the following two situations based on a different quantity of channels of each of the N matrices in the matrix transformation.

Situation 1:

Optionally, the quantity of channels of each of the N matrices in the foregoing matrix transformation may be 1.

Optionally, the N matrices may include M groups of convolution kernels, and the M groups of convolution kernels respectively correspond to the M channels of the candidate output feature map.

Optionally, the M groups of convolution kernels may one-to-one correspond to the M channels of the candidate output feature map.

For example, a first group of the M groups of convolution kernels may correspond to a first channel of the M channels of the candidate output feature map, a second group of the M groups of convolution kernels may correspond to a second channel of the M channels of the candidate output feature map, . . . , and an $M^{th}$ group of the M groups of convolution kernels may correspond to an $M^{th}$ channel of the M channels of the candidate output feature map.

In this application, the step of performing matrix transformation on the M channels of the candidate output feature map based on N matrices, to obtain an output feature map of N channels may include: performing convolution on a corresponding channel of the M channels of the candidate output feature map based on each of the M groups of convolution kernels, to obtain the output feature map of the N channels.

Specifically, the first group of the M groups of convolution kernels may be used to perform convolution on the first channel of the M channels of the candidate output feature map, . . . , and the $M^{th}$ group of the M groups of convolution kernels may be used to perform convolution on the $M^{th}$ channel of the M channels of the candidate output feature map.

For example, if the first group of the M groups of convolution kernels includes S convolution kernels (a quantity of channels of the convolution kernel is 1), such as $\Phi_{1,1}$ to $\Phi_{1,s}$ as shown in FIG. 7, the S convolution kernels may be used to perform convolution on the first channel of the M channels of the candidate output feature map, to obtain S output feature maps (or it may be considered that an output feature map whose quantity of channels is S is obtained).

Another group of the M groups of convolution kernels are similar to the first group of the M groups of convolution kernels, and may also include S convolution kernels. Details are not described herein again.

Optionally, when the quantity of channels of each of the N matrices in the foregoing matrix transformation is 1, a quantity of floating point operations (floating point operations, FLOPs) $r_S$ of the feature augment unit may be approximately represented by the formula (1):

$$r_S = \frac{S^*C}{S+C-1} \quad (1)$$

S is a quantity of convolutions included in each of the M groups of convolution kernels, and C is a quantity of channels of the input feature map of the feature augment unit.

Optionally, when S is far less than C, the formula (1) may be approximately represented by the following formula (2):

$$r_S = \frac{S^*C}{S+C-1} \approx S \quad (2)$$

Similarly, when the quantity of channels of each of the N matrices in the matrix transformation is 1, a compression ratio $r_C$ of the quantity of parameters of the feature augment unit may be approximately represented by the formula (3):

$$r_C = \frac{S^*C}{S+C-1} \quad (3)$$

S is a quantity of convolutions included in each of the M groups of convolution kernels, and C is a quantity of channels of the input feature map of the feature augment unit.

Optionally, when S is far less than C, the formula (3) may be approximately represented by the formula (4):

$$r_C = \frac{S*C}{S+C-1} \approx S \qquad (4)$$

In this application, the step of performing convolution on a corresponding channel of the M channels of the candidate output feature map based on each of the M groups of convolution kernels, to obtain the output feature map of the N channels may include: performing, based on each of the M groups of convolution kernels, depthwise convolution (depthwise convolution) on the corresponding channel of the M channels of the candidate output feature map, to obtain the output feature map of the N channels.

Specifically, for the depthwise convolution, refer to the prior art. Details are not described herein.

In this application, a convolution kernel in each of the M groups of convolution kernels is the same as a convolution kernel in another group of the M groups of convolution kernels.

In other words, a same convolution kernel may be reused to perform convolution on the M channels of the candidate output feature map.

For example, the first group of the M groups of convolution kernels includes the S convolution kernels, for example, $\Phi_{1,1}$ to $\Phi_{1,s}$ shown in FIG. 7, and the S convolution kernels may be sequentially used to perform convolution on the first channel of the M channels of the candidate output feature map. S convolution kernels included in the second group of the M groups of convolution kernels may also be $\Phi_{1,1}$ to $\Phi_{1,s}$ shown in FIG. 7, and the S convolution kernels may be sequentially used to perform convolution on the second channel of the M channels of the candidate output feature map.

Similarly, S convolution kernels included in the another group of the M groups of convolution kernels may also be $\Phi_{1,1}$ to $\Phi_{1,s}$ shown in FIG. 7. Details are not described herein again.

Because the quantity of channels of each of the N matrices (namely, the foregoing N convolution kernels) in the matrix transformation is 1 (less than the quantity M of channels of the candidate output feature map), the computation amount and the quantity of parameters of the feature augment unit may be reduced, and the computation amount and the quantity of parameters of the image classification processing are reduced.

Situation 2:

Optionally, the quantity of channels of each of the N matrices in the foregoing matrix transformation may be greater than 1.

For example, in the foregoing matrix transformation, the quantity of channels of each of the N matrices is equal to 2. The N matrices may be divided into M/2 groups of convolution kernels, and the M/2 groups of convolution kernels may one-to-one correspond to two channels of the M channels of the candidate output feature map.

It should be noted that a person skilled in the art may understand that, when the quantity of channels of each of the N convolution kernels is 2, if the matrix transformation needs to be performed on the input feature map (namely, the candidate output feature map of the M channels) based on the N convolution kernels, the quantity of channels of each of the N convolution kernels needs to be consistent with (or the same as) the quantity of channels of the input feature map.

In this case, the candidate output feature map of the M channels is equivalent to dividing into M/2 feature maps whose quantities of channels are all 2, and convolution is performed on the feature maps and the N convolution kernels. Correspondingly, the N convolution kernels are also equivalent to dividing into M/2 groups of convolution kernels. It should be understood that the "division" herein is merely an example description for ease of understanding, and there may be no division operation in practice.

For example, a first group of the M/2 groups of convolution kernels may correspond to a first channel and a second channel of the M channels of the candidate output feature map, a second group of the M/2 groups of convolution kernels may correspond to a third channel and a fourth channel of the M channels in the candidate output feature map, . . . , and an $(M/2)^{th}$ group of the M/2 groups of convolution kernels may correspond to an $(M-1)^{th}$ channel and an $M^{th}$ channel of the M channels of the candidate output feature map.

Optionally, convolution is performed on a corresponding channel of the M channels of the candidate output feature map based on each of the M/2 groups of convolution kernels, to obtain the output feature map of the N channels.

For example, the first group of the M/2 groups of convolution kernels may be used to perform convolution on the first channel and the second channel of the M channels of the candidate output feature map, . . . , and the $(M/2)^{th}$ group of the M/2 groups of convolution kernels may be used to perform convolution on the $(M-1)^{th}$ channel and the $M^{th}$ channel of the M channels of the candidate output feature map.

Optionally, a convolution kernel in each of the M/2 groups of convolution kernels is the same as a convolution kernel in another group of the M/2 groups of convolution kernels. In other words, a same convolution kernel may be reused to perform convolution on the M channels of the candidate output feature map.

In this embodiment of this application, a case in which the quantity of channels of each of the N matrices in the matrix transformation is greater than 2 is similar to that in the foregoing embodiment in which the quantity of channels of each of the N matrices in the matrix transformation is equal to 2. Details are not described herein again.

Because the quantity of channels of each of the N matrices (namely, the foregoing N convolution kernels) in the matrix transformation may be less than the quantity M of channels of the candidate output feature map, the computation amount and the quantity of parameters of the feature augment unit may be reduced, and the computation amount and the quantity of parameters of the image classification processing are reduced.

Optionally, the quantity of channels of each of the N matrices (the foregoing N convolution kernels) in the foregoing matrix transformation may be equal to the quantity M of channels of the candidate output feature map.

In this application, the step of classifying the to-be-processed image based on the output feature map, to obtain a classification result of the to-be-processed image may include: performing feature splicing on the candidate output feature map and the output feature map to obtain a feature splicing feature map, where a quantity of channels of the feature splicing feature map is M+N; and classifying the to-be-processed image based on the feature stitching feature map, to obtain the classification result of the to-be-processed image.

The foregoing feature splicing means that the candidate output feature map and the output feature map constitute a new feature map in a depth direction, namely, the foregoing feature splicing feature map.

For example, the quantity of channels of the candidate output feature map is M, the quantity of channels of the output feature map is N, and feature splicing may be performed on the candidate output feature map and the output feature map, to obtain a feature splicing feature map whose quantity of channels is M+N.

The feature splicing may introduce more details (or features) into the output feature map in a manner of identity feature mapping. In addition, an additional parameter or computation amount is not introduced through the identity mapping. Therefore, when the parameter amount and the computation amount are not increased, an image classification effect is improved.

S540: Classify the to-be-processed image based on the output feature map, to obtain the classification result of the to-be-processed image.

Figure 8:
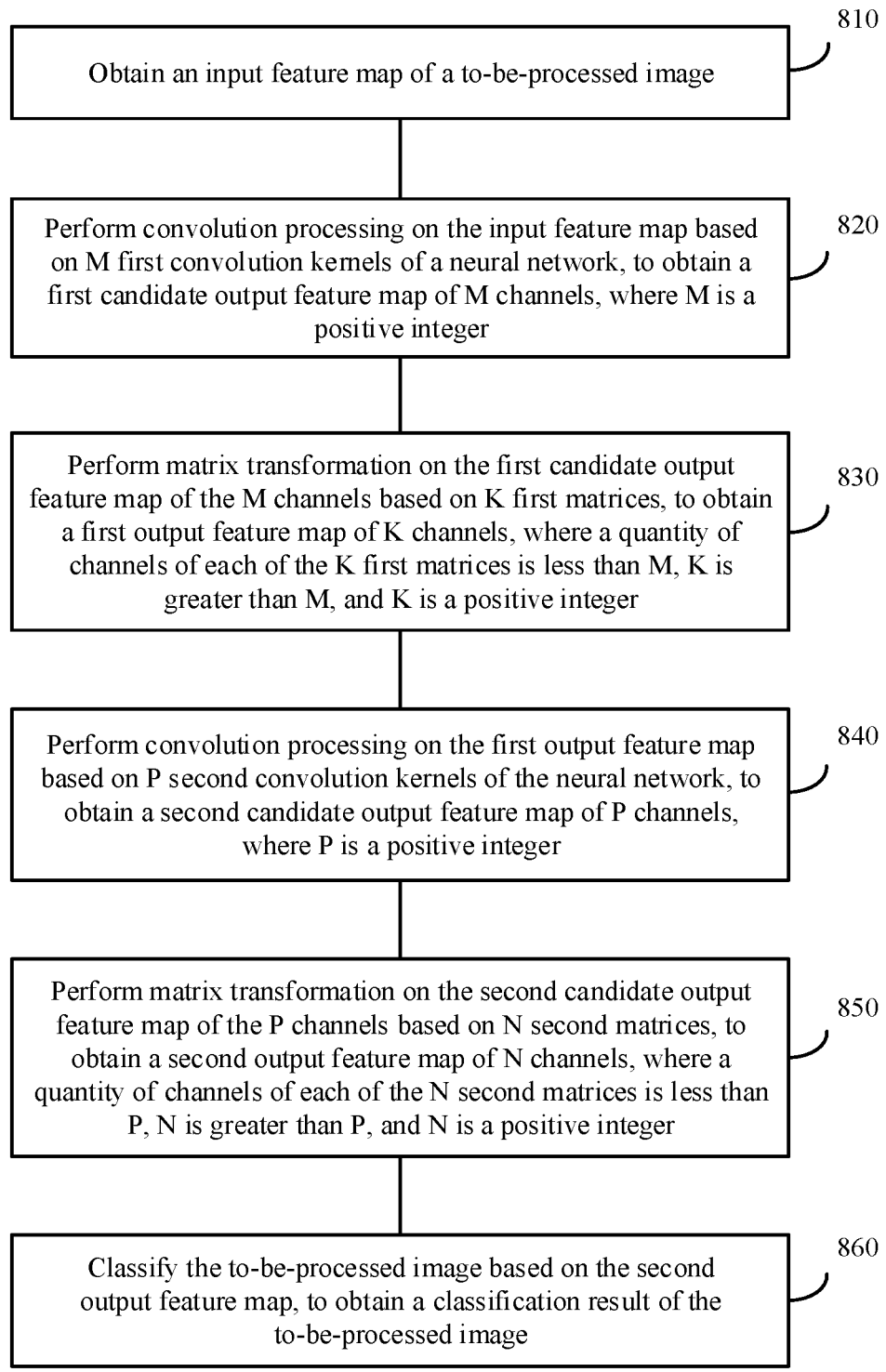
FIG. 8 is a schematic flowchart of an image classification method according to another embodiment of this application.

FIG. 8 is a schematic flowchart of an image classification method 800 according to another embodiment of this application. The method may be performed by an apparatus that can perform image classification. For example, the method may be performed by the terminal device in FIG. 4.

S810: Obtain an input feature map of a to-be-processed image.

When the method shown in FIG. 5 is performed by the terminal device in FIG. 4, the to-be-processed image may be an image photographed by the terminal device by using a camera, or the to-be-processed image may be an image obtained from inside the terminal device (for example, an image stored in an album of the terminal device, or an image obtained by the terminal device from a cloud).

Alternatively, the input feature map of the to-be-processed image may be a feature map obtained after processing at another layer in a convolutional neural network. It should be understood that the another layer in the convolutional neural network herein is a layer in the convolutional neural network. For example, the another layer may be one of an input layer, a convolutional layer, a pooling layer, or a fully connected layer in the convolutional neural network.

S820: Perform convolution processing on the input feature map based on M first convolution kernels of a neural network, to obtain a first candidate output feature map of M channels, where M is a positive integer.

The M first convolution kernels may be standard convolution kernels in an existing convolutional neural network.

S830: Perform matrix transformation on the first candidate output feature map of the M channels based on K first matrices, to obtain a first output feature map of K channels.

A quantity of channels of each of the K first matrices is less than M, K is greater than M, and K is a positive integer.

Optionally, S820 and S830 may be implemented by a feature augment unit (feature in feature, FiF) in the method 500 in FIG. 5.

For ease of understanding, the feature augment unit that implements S820 and S830 may also be referred to as a first feature augment unit in the following embodiments.

S840: Perform convolution processing on the first output feature map based on P second convolution kernels of the neural network, to obtain a second candidate output feature map of P channels, where P is a positive integer.

The P second convolution kernels may be standard convolution kernels in the existing convolutional neural network.

Optionally, the step of performing convolution processing on the first output feature map based on P second convolution kernels of the neural network, to obtain a second candidate output feature map of P channels may include: performing depthwise convolution on the first output feature map to obtain a depthwise convolutional feature map; and performing convolution processing on the depthwise convolutional feature map based on the P second convolution kernels, to obtain the second candidate output feature map.

Optionally, the step of performing depthwise convolution on the first output feature map to obtain a depthwise convolutional feature map may include: performing depthwise convolution on the first output feature map with a stride length greater than 1, to obtain the depthwise convolutional feature map.

S850: Perform matrix transformation on the second candidate output feature map of the P channels based on N second matrices, to obtain a second output feature map of N channels.

A quantity of channels of each of the N second matrices is less than P, N is greater than P, and N is a positive integer.

Optionally, S840 and S850 may also be implemented by a feature augment unit (feature in feature, FiF) in the method 500 in FIG. 5.

For ease of understanding, the feature augment unit that implements S840 and S850 may also be referred to as a second feature augment unit in the following embodiments.

S860: Classify the to-be-processed image based on the second output feature map, to obtain a classification result of the to-be-processed image.

Optionally, the step of classifying the to-be-processed image based on the second output feature map, to obtain a classification result of the to-be-processed image may include: performing residual connection on the input feature map and the second output feature map to obtain a residual connection feature map; and classifying the to-be-processed image based on the residual connection feature map, to obtain the classification result of the to-be-processed image.

In this application, S820 to S850 may be implemented by a spindle module (spindle block) in the embodiments of this application. The spindle module may be configured to replace one module (block) in an existing convolutional neural network model. For example, one module in the existing convolutional neural network model may include two convolutional layers.

For ease of understanding, the spindle module in the following embodiments refers to the spindle module in the method 800 (S820 to S850) in FIG. 8.

To be specific, the spindle module may include the foregoing first feature augment unit and the second feature augment unit.

The spindle module may include at least two feature augment units (for example, the feature augment unit shown in FIG. 5). The feature augment unit performs convolution processing by using a small quantity of standard convolution kernels, to obtain a small quantity of candidate feature maps, and performs the matrix transformation on the small quantity of candidate feature maps to obtain a required output feature map, so that redundancy between output feature maps can be reduced. This helps reduce a computation amount and a quantity of parameters of image classification processing. The following describes in detail the spindle module in S820 to S850 with reference to FIG. 9 and FIG. 10.

In this application, there may be the following two situations based on a different stride (stride) length of the spindle module.

Figure 9:
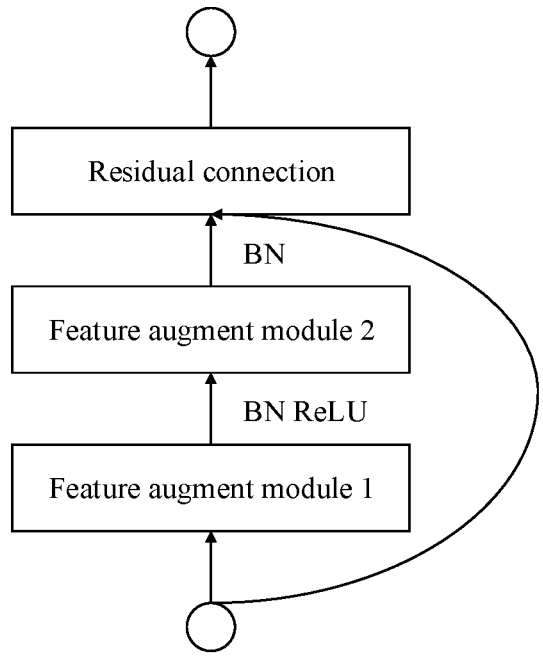
FIG. 9 is a schematic block diagram of a spindle module according to an embodiment of this application.

Situation 1:

FIG. 9 shows a spindle module whose stride length is 1 according to an embodiment of this application. The spindle module may include at least two feature augment units (for example, the feature augment unit shown in FIG. 5).

For the spindle module whose stride length is 1, a size (width and height) of an input feature map is the same as a size of an output feature map.

For example, the input feature map of the spindle module is the input feature map of the to-be-processed image, and the output feature map of the spindle module is the second output feature map of the N channels. If the size of the input feature map is A*B, a size of the second output feature map is also A*B.

Optionally, in the spindle module, depthwise convolution may further be performed between the first feature augment unit and the second feature augment unit. Optionally, a stride length of the depthwise convolution may be 1.

Optionally, when the stride length of the spindle module is 1, the size (width and height) of the input feature map of the spindle module is the same as the size of the output feature map. Therefore, residual connection may further be performed on the spindle module. To be specific, residual connection is performed on the input feature map and the second output feature map.

In this case, the residual connection is performed on the input feature map and the second output feature map to obtain the residual connection feature map. Correspondingly, the to-be-processed image is classified based on the residual connection feature map, to obtain the classification result of the to-be-processed image.

For detailed descriptions of the residual connection, refer to the prior art. Details are not described herein.

More details (or features) may be introduced into the output feature map through the residual connection. In addition, an additional parameter or computation amount is not introduced through the residual connection. Therefore, when the quantity of parameters and the computation amount are not increased, an image classification effect is improved.

Figure 10:
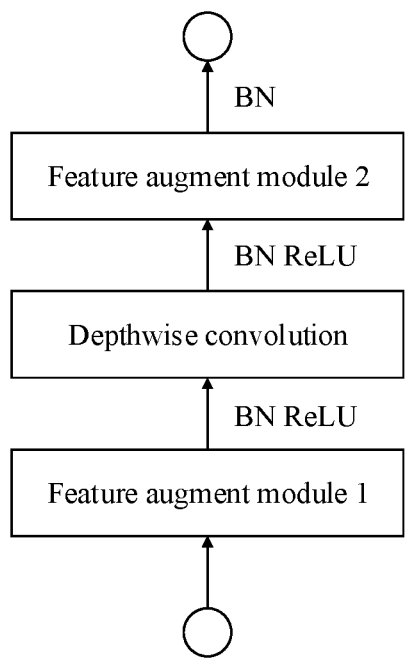
FIG. 10 is a schematic block diagram of a spindle module according to another embodiment of this application.

Situation 2:

FIG. 10 shows a spindle module whose stride length is greater than 1 according to an embodiment of this application. The spindle module may include at least two feature augment units (for example, the feature augment unit shown in FIG. 5).

For the spindle module whose stride length is greater than 1, a size (width and height) of an output feature map is less than a size of an input feature map.

An example in which the stride length of the spindle module is equal to 2 is used for description. In this case, the size (width and height) of the output feature map is half of the size of the input feature map.

For example, the input feature map of the spindle module is the input feature map of the to-be-processed image, and the output feature map of the spindle module is the second output feature map of the N channels. If the size of the input feature map is A*B, a size of the second output feature map is also (A/2)*(B/2).

Optionally, in the spindle module, depthwise convolution may further be performed between the first feature augment unit and the second feature augment unit. Optionally, a stride length of the depthwise convolution may be greater than 1.

In this embodiment of this application, a quantity of channels of the output feature map of the spindle module may be N (namely, the second output feature map of the N channels), and a quantity of channels of an output feature map of the first feature augment unit may be K (namely, the first output feature map of the K channels). The quantity K of channels of the output feature map of the first feature augment unit is greater than N, and correspondingly, the quantity K of channels is reduced to N by using the second feature augment unit.

In other words, in the spindle module, the first feature augment unit may be used to increase the quantity of channels, and the second feature augment unit may be used to decrease the quantity of channels, so as to meet the quantity of channels of the output feature map of the spindle module.

For example, the quantity of channels of the output feature map of the spindle module is 100 (namely, a second output feature map of 100 channels), and the quantity of channels of the output feature map of the first feature augment unit may be 1000 (namely, a first output feature map of 1000 channels). In this case, the quantity 1000 of channels of the output feature map of the first feature augment unit is greater than the quantity 100 of the output feature map of the spindle module, and correspondingly, the quantity 1000 of channels may be reduced to 100 by using the second feature augment unit.

In this embodiment of this application, the first feature augment unit is used to increase the quantity of channels, so that more features can be extracted, to improve an image classification effect.

Further, the feature augment unit in this embodiment of this application may be configured to implement convolution processing in the existing convolutional neural network by using the small quantity of standard convolution kernels and based on the matrix transformation. This can effectively reduce the redundancy between output feature maps, and reduce a computation amount and a quantity of parameters of the neural network model, thereby reducing the computation amount and the quantity of parameters of the image classification processing. Therefore, in the spindle module in this embodiment of this application, the image classification effect can be improved without increasing the quantity of parameters and the computation amount (or reducing the quantity of parameters and the computation amount).

Figure 11:
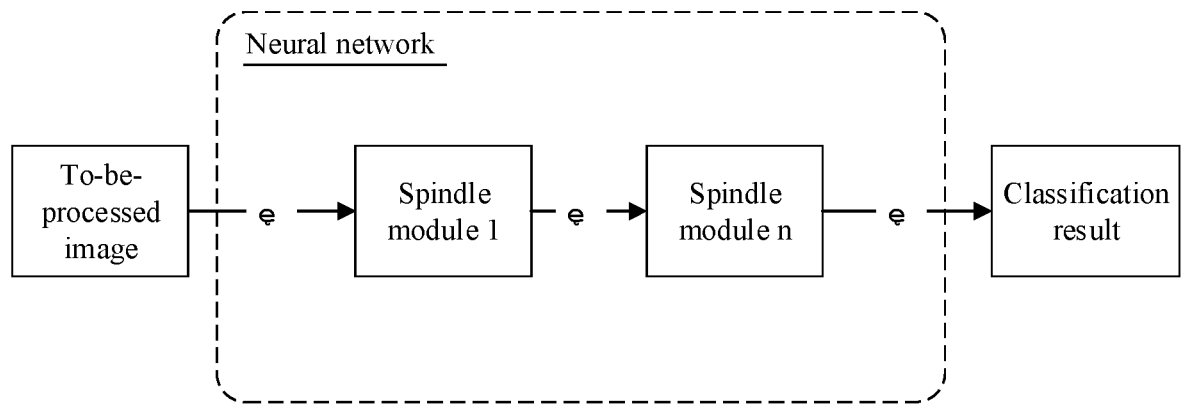
FIG. 11 is a schematic block diagram of a neural network according to an embodiment of this application.

FIG. 11 is a schematic block diagram of a neural network according to an embodiment of this application. The neural network shown in FIG. 11 may be used to implement the image classification method shown in FIG. 8.

The neural network in FIG. 11 may include one or more spindle modules in the method 800 in FIG. 8. The spindle module may be configured to replace one module (block) in an existing convolutional neural network model. For example, one module in the existing convolutional neural network model may include two convolutional layers.

The spindle module may include at least two feature augment units shown in FIG. 5. For example, the spindle module may include two feature augment units as described in the method 800 in FIG. 8: the first feature augment unit and the second feature augment unit. One feature augment unit may be used to replace one convolutional layer in the existing convolutional neural network model.

The neural network shown in FIG. 11 may further include a convolutional layer, a pooling layer, a fully connected layer, or the like. This is not limited in this application.

Based on the neural network structure shown in FIG. 11, an embodiment of this application provides an efficient neural network model HWNet. As shown in the neural network in FIG. 11, the HWNet includes a plurality of spindle modules. Each spindle module includes a feature augment module. For a network structure of the HWNet, refer to a design criterion of an existing neural network. For example, in a design of the existing neural network, as the size of the feature map gradually decreases, the quantity of channels of the feature map gradually increases. A specific structure of the HWNet may be shown in the following Table 1.

TABLE 1

Network structure of HWNet in this application

| Layer | Input size | Quantity of input channels | Quantity of output channels | Operator | Repetition | Stride length |
|---|---|---|---|---|---|---|
| Convolutional layer 1 | 224*224 | 3 | 16 | Convolution kernel (3*3) | 1 | 2 |
| Phase 1 | 112*112 | 16 | 16 | Spindle module | 1 | 1 |
|  | 112*112 | 16 | 32 | Spindle module | 1 | 2 |
| Phase 2 | 56*56 | 32 | 32 | Spindle module | 1 | 1 |
|  | 56*56 | 32 | 64 | Spindle module | 1 | 2 |
| Phase 3 | 28*28 | 64 | 64 | Spindle module | 2 | 1 |
|  | 28*28 | 64 | 96 | Spindle module | 1 | 2 |
| Phase 4 | 14*14 | 96 | 96 | Spindle module | 2 | 1 |
|  | 14*14 | 96 | 128 | Spindle module | 1 | 1 |
|  | 14*14 | 128 | 128 | Spindle module | 2 | 1 |
|  | 14*14 | 128 | 256 | Spindle module | 1 | 2 |
| Phase 5 | 7*7 | 256 | 256 | Spindle module | 1 | 1 |
|  | 7*7 | 256 | 512 | Feature augment unit | 1 | 1 |
| Global pooling | 7*7 | — | — | Average pooling (7*7) | — | — |
| Convolutional layer 2 | 1*1 | 512 | 1280 | Convolution kernel (1*1) | — | — |
| Fully-connection | 1*1 | 1280 | 1000 | Fully-connection | — | — |

As shown in Table 1, there is a convolutional layer with 16 standard convolution kernels and 12 spindle modules whose each quantity of channels of the input feature map gradually increases at the layer 1 of the HWNet. These spindle module groups are divided into five phases, and a feature map in each phase have a same size.

Table 2 below shows test experimental data of image classification performed on an ImageNet dataset by using HWNet and several existing neural network models.

TABLE 2

Test data of both HWNet and several existing neural network models in this application

| Model | Weight (MByte) | Quantity of floating-point computations (MByte) | Top 1 predicted accuracy rate (%) |
|---|---|---|---|
| MobileNet V1: 0.25*[13] | 0.5 | 41 | 49.8 |
| ShuffleNet V1: 0.5*[43] | 1.4 | 38 | 57.7 |
| MobileNet V2: 0.35*[30] | 1.7 | 59 | 60.3 |
| ShuffleNet V2: 0.5*[25] | 1.0 | 41 | 60.3 |
| HWNet: 0.5 | 1.0 | 49 | 62.0 |
| MobileNet V1: 0.5*[13] | 1.3 | 150 | 63.3 |
| ShuffleNet V1: 1.0*[43] | 2.3 | 140 | 67.4 |
| ShuffleNet V2: 1.0*[25] | 2.3 | 146 | 69.4 |
| HWNet: 0.9 | 2.3 | 141 | 70.1 |
| IGCV3-D: 0.7*[33] | 2.8 | 210 | 68.5 |
| MobileNet V2: 0.75*[30] | 2.6 | 209 | 69.8 |
| HWNet: 1.0 | 2.7 | 171 | 70.9 |
| MobileNet V1: 0.75*[13] | 2.6 | 317 | 68.4 |
| ShuffleNet V1: 1.5*[43] | 3.4 | 292 | 69.0 |
| MobileNet V2: 1.0*[30] | 3.5 | 300 | 71.8 |
| IGCV3-D: 1.0*[37] [33] | 3.5 | 318 | 72.2 |

TABLE 2-continued

Test data of both HWNet and several existing neural network models in this application

| Model | Weight (MByte) | Quantity of floating-point computations (MByte) | Top 1 predicted accuracy rate (%) |
|---|---|---|---|
| ShuffleNet V2: 1.5*[25] | 3.5 | 299 | 72.6 |
| HWNet: 1.25 | 3.8 | 260 | 72.8 |

The MobileNet is a convolutional neural network model proposed by Google (Google), the ShuffleNet is a convolutional neural network model designed for a mobile terminal device and proposed by Megvii Technology Inc., and the IGCV3 is an interleaved low-rank group convolution.

It can be learned from the foregoing Table 2 that, compared with the several existing neural network models, the HWNet provided in this embodiment of this application has higher precision when parameters are fewer and computation is faster.

Figure 12:
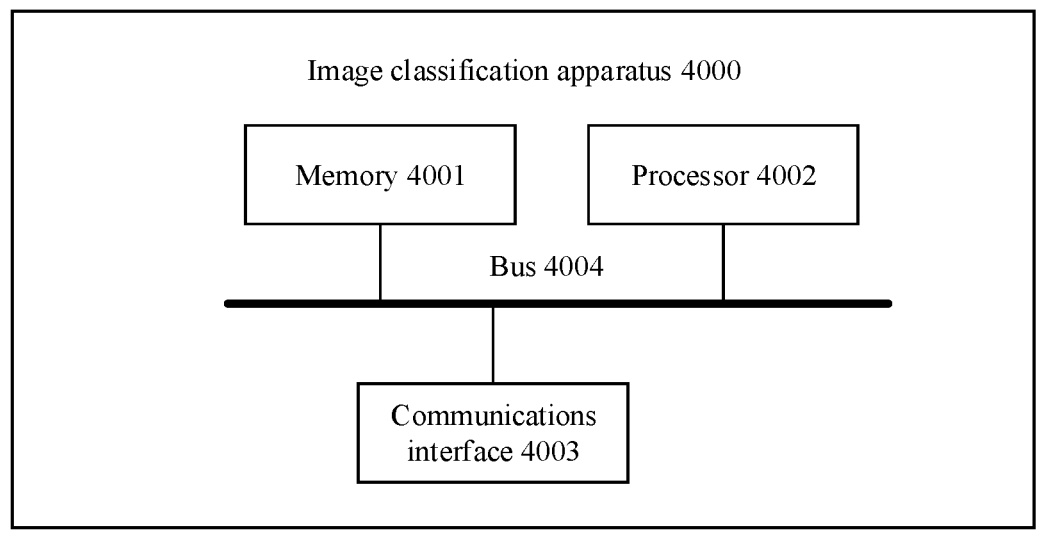
FIG. 12 is a schematic diagram of a hardware structure of an image classification apparatus according to an embodiment of this application.

FIG. 12 is a schematic diagram of a hardware structure of an image classification apparatus 4000 according to an embodiment of this application. The image classification apparatus 4000 shown in FIG. 12 includes a memory 4001, a processor 4002, a communications interface 4003, and a bus 4004. Communication connections between the memory 4001, the processor 4002, and the communications interface 4003 are implemented through the bus 4004.

The memory 4001 may be a read-only memory (read-only memory, ROM), a static storage device, a dynamic storage device, or a random access memory (random access memory, RAM). The memory 4001 may store a program. When the program stored in the memory 4001 is executed by the processor 4002, the processor 4002 and the communications interface 4003 are configured to perform the steps of the image classification method in the embodiments of this application.

The processor 4002 may be a general-purpose central processing unit (central processing unit, CPU), a microprocessor, an application-specific integrated circuit (application-specific integrated circuit, ASIC), a graphics processing unit (graphics processing unit, GPU), or one or more integrated circuits, and is configured to execute a related program, so as to implement a function that needs to be performed by a unit of the image classification apparatus in the embodiments of this application, or perform the image classification method in the method embodiments of this application.

The processor 4002 may be an integrated circuit chip and has a signal processing capability. In an implementation process, the steps of the image classification method in the embodiments of this application can be implemented by using a hardware integrated logic circuit or an instruction in a form of software in the processor 4002.

The foregoing processor 4002 may further be a general-purpose processor, a digital signal processor (digital signal processor, DSP), an ASIC, a field programmable gate array (field programmable gate array, FPGA) or another programmable logic device, a discrete gate or transistor logic device, or a discrete hardware component. The foregoing general-purpose processor may be a microprocessor, any conventional processor, or the like. Steps of the methods disclosed with reference to the embodiments of this application may be directly executed and accomplished by using a hardware decoding processor, or may be executed and accomplished by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory 4001. The processor 4002 reads information in the memory 4001, and completes, in combination with hardware of the processor 4002, the function that needs to be performed by the unit of the image classification apparatus in the embodiments of this application, or perform the image classification method in the method embodiments of this application.

The communications interface 4003 uses a transceiver apparatus, for example, but not limited to, a transceiver, to implement communication between the apparatus 4000 and another device or a communications network. For example, a to-be-processed image may be obtained through the communications interface 4003.

The bus 4004 may include a path for information transfer between various components (for example, the memory 4001, the processor 4002, and the communications interface 4003) of the apparatus 4000.

Figure 13:
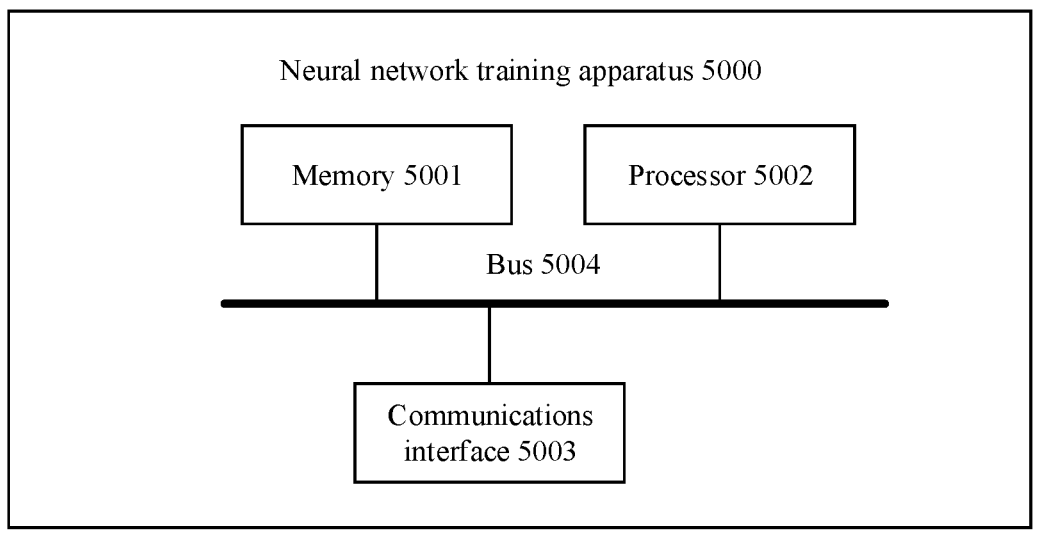
FIG. 13 is a schematic diagram of a hardware structure of a neural network training apparatus according to an embodiment of this application.

FIG. 13 is a schematic diagram of a hardware structure of a neural network training apparatus 5000 according to an embodiment of this application. Similar to the foregoing apparatus 4000, the neural network training apparatus 5000 shown in FIG. 13 includes a memory 5001, a processor 5002, a communications interface 5003, and a bus 5004. Communication connections between the memory 5001, the processor 5002, and the communications interface 5003 are implemented through the bus 5004.

The memory 5001 may store a program. When the program stored in the memory 5001 is executed by the processor 5002, the processor 5002 is configured to perform the steps of a training method for training the image classification apparatus in the embodiments of this application.

The processor 5002 may be a general-purpose CPU, a microprocessor, an ASIC, a GPU, or one or more integrated circuits, and is configured to execute a related program, so as to implement the training method for training the image classification apparatus in the embodiments of this application.

The processor 5002 may alternatively be an integrated circuit chip and has a signal processing capability. In a training implementation process, steps of the training method of the image classification apparatus in the embodiments of this application can be implemented by using a hardware integrated logic circuit or an instruction in a form of software in the processor 5002.

It should be understood that the image classification apparatus is trained by using the neural network training apparatus 5000 shown in FIG. 13, and the image classification apparatus obtained through training may be configured to perform the image classification method in the embodiments of this application. Specifically, a neural network in the method shown in FIG. 5 or FIG. 8 can be obtained by training a neural network by using the apparatus 5000.

Specifically, the apparatus shown in FIG. 13 may obtain training data and a to-be-trained image classification apparatus from outside through the communications interface 5003, and then the processor trains the to-be-trained image classification apparatus based on the training data.

It should be noted that, although only the memory, the processor, and the communications interface are shown in each of the apparatus 4000 and the apparatus 5000, in a specific implementation process, a person skilled in the art should understand that the apparatus 4000 and the apparatus 5000 each may further include another component necessary for normal running. In addition, based on a specific requirement, a person skilled in the art should understand that the apparatus 4000 and the apparatus 5000 may further include hardware components for implementing other additional functions. In addition, a person skilled in the art should understand that the apparatus 4000 and the apparatus 5000 each may include only components necessary for implementing the embodiments of this application, but not necessarily include all the components shown in FIG. 12 and FIG. 13.

It should be understood that, the processor in the embodiments of this application may be a central processing unit (central processing unit, CPU), or may further be another general-purpose processor, a digital signal processor (digital signal processor, DSP), an application-specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, any conventional processor, or the like.

It may be understood that the memory in the embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memory (random access memory, RAM) may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by using software, hardware, firmware, or any combination thereof. When software is used to implement the embodiments, the foregoing embodiments may be implemented in a form of a computer program product. The computer program product includes one or more computer instructions or computer programs. When the program instructions or the computer programs are loaded and executed on the computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists, where A and B may be singular or plural. In addition, the character "/" in this specification usually represents an "or" relationship between the associated objects, or may represent an "and/or" relationship. For details, refer to foregoing and following descriptions for understanding.

In this application, "at least one" means one or more, and "a plurality of" means two or more. "At least one item (piece) of the following" or a similar expression thereof refers to any combination of these items, including any combination of a singular item (piece) or plural items (pieces). For example, at least one item (piece) of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image classification method, comprising:
    obtaining an input feature map of a to-be-processed image;
    performing convolution processing on the input feature map based on M convolution kernels of a neural network, to obtain an intermediate feature map comprising M channels, wherein M is a positive integer;
    performing convolution processing on the M channels of the intermediate feature map based on N matrices, to obtain an output feature map comprising N channels, wherein the N matrices represent N convolution kernels, the N matrices comprise M groups of convolution kernels, and the M groups of convolution kernels respectively correspond to the M channels of the intermediate feature map, and wherein a quantity of channels of each of the N matrices is less than M, N is greater than M, and N is a positive integer; and
    classifying the to-be-processed image based on the output feature map, to obtain a classification result of the to-be-processed image.

2. The image classification method according to claim 1, wherein
    performing the convolution processing on the M channels of the intermediate feature map based on the N matrices, to obtain the output feature map comprising the N channels, comprises:
        performing convolution on a corresponding channel of the M channels of the intermediate feature map based on each of the M groups of convolution kernels, to obtain the output feature map comprising the N channels.

3. The image classification method according to claim 2, wherein performing the convolution on a corresponding channel of the M channels of the intermediate feature map based on each of the M groups of convolution kernels, to obtain the output feature map comprising the N channels, comprises:
    performing, based on each of the M groups of convolution kernels, depthwise convolution on the corresponding channel of the M channels of the intermediate feature map, to obtain the output feature map comprising the N channels.

4. The image classification method according to claim 2, wherein a convolution kernel in each of the M groups of convolution kernels is the same as a convolution kernel in another group of the M groups of convolution kernels.

5. The image classification method according to claim 1, wherein classifying the to-be-processed image based on the output feature map, to obtain a classification result of the to-be-processed image, comprises:
    combining the intermediate feature map and the output feature map to obtain a feature splicing feature map, wherein a quantity of channels of the feature splicing feature map is M+N; and
    classifying the to-be-processed image based on the feature splicing feature map, to obtain the classification result of the to-be-processed image.

6. An image classification apparatus, comprising:
    one or more processors; and
    one or more memories coupled to the one or more processors and store programming instructions for execution by the one or more processors to:
        obtain an input feature map of a to-be-processed image;
        perform convolution processing on the input feature map based on M convolution kernels of a neural network, to obtain an intermediate feature map comprising M channels, wherein M is a positive integer;
        perform convolution processing on the M channels of the intermediate feature map based on N matrices, to obtain an output feature map comprising N channels, wherein the N matrices represent N convolution kernels, the N matrices comprise M groups of convolution kernels, and the M groups of convolution kernels respectively correspond to the M channels of the intermediate feature map, and wherein a quantity of channels of each of the N matrices is less than M, N is greater than M, and N is a positive integer; and
        classify the to-be-processed image based on the output feature map, to obtain a classification result of the to-be-processed image.

7. The image classification apparatus according to claim 6, wherein
    the one or more memories store programming instructions for execution by the one or more processors to perform convolution on a corresponding channel of the M channels of the intermediate feature map based on each of the M groups of convolution kernels, to obtain the output feature map comprising the N channels.

8. The image classification apparatus according to claim 7, wherein the one or more memories store programming instructions for execution by the one or more processors to:
    perform, based on each of the M groups of convolution kernels, depthwise convolution on the corresponding channel of the M channels of the intermediate feature map, to obtain the output feature map comprising the N channels.

9. The image classification apparatus according to claim 7, wherein a convolution kernel in each of the M groups of convolution kernels is the same as a convolution kernel in another group of the M groups of convolution kernels.

10. The image classification apparatus according to claim 6, wherein the one or more memories store programming instructions for execution by the one or more processors to:
    combining the intermediate feature map and the output feature map to obtain a feature splicing feature map, wherein a quantity of channels of the feature splicing feature map is M+N; and
    classify the to-be-processed image based on the feature splicing feature map, to obtain the classification result of the to-be-processed image.

11. A non-transitory computer-readable storage medium, wherein the non-transitory computer-readable storage medium stores one or more instructions that when executed by a device, cause the device to perform operations comprising:
    obtaining an input feature map of a to-be-processed image;
    performing convolution processing on the input feature map based on M convolution kernels of a neural network, to obtain an intermediate feature map comprising M channels, wherein M is a positive integer;
    performing convolution processing on the M channels of the intermediate feature map based on N matrices, to obtain an output feature map comprising N channels, wherein the N matrices represent N convolution kernels, the N matrices comprise M groups of convolution kernels, and the M groups of convolution kernels respectively correspond to the M channels of the intermediate feature map, and wherein a quantity of channels of each of the N matrices is less than M, N is greater than M, and N is a positive integer; and
    classifying the to-be-processed image based on the output feature map, to obtain a classification result of the to-be-processed image.

12. The non-transitory computer-readable storage medium according to claim 11, wherein
    performing the convolution processing on the M channels of the intermediate feature map based on the N matrices, to obtain the output feature map comprising the N channels, comprises:
    performing convolution on a corresponding channel of the M channels of the intermediate feature map based on each of the M groups of convolution kernels, to obtain the output feature map comprising the N channels.

13. The non-transitory computer-readable storage medium according to claim 12, wherein performing the convolution on a corresponding channel of the M channels of the intermediate feature map based on each of the M groups of convolution kernels, to obtain the output feature map comprising the N channels, comprises:
    performing, based on each of the M groups of convolution kernels, depthwise convolution on the corresponding channel of the M channels of the intermediate feature map, to obtain the output feature map comprising the N channels.

14. The non-transitory computer-readable storage medium according to claim 12, wherein a convolution kernel in each of the M groups of convolution kernels is the same as a convolution kernel in another group of the M groups of convolution kernels.

15. The non-transitory computer-readable storage medium according to claim 11, wherein classifying the to-be-processed image based on the output feature map, to obtain a classification result of the to-be-processed image, comprises:
    combining the intermediate feature map and the output feature map to obtain a feature splicing feature map, wherein a quantity of channels of the feature splicing feature map is M+N; and
    classifying the to-be-processed image based on the feature splicing feature map, to obtain the classification result of the to-be-processed image.

* * * * *